United States Patent
Hiramatsu et al.

(10) Patent No.: US 6,892,560 B2
(45) Date of Patent: May 17, 2005

(54) MOLD CLAMPING APPARATUS AND MOLD CLAMPING METHOD

(75) Inventors: Koichi Hiramatsu, Toyota (JP); Yoshiaki Kadoma, Okazaki (JP); Kyoichi Mano, Ciryu (JP); Tsutomu Haeno, Kisarazu (JP); Hiroo Ishibashi, Kisarazu (JP); Kazuyuki Kawano, Nagoya (JP); Osamu Honda, Tokai (JP); Itsuro Hiroshige, Handa (JP); Kouichi Sato, Tokai (JP)

(73) Assignees: Toyota Jidosha Kabushiki Kaisha, Tokyo (JP); Nippon Steel Corporation, Tokyo (JP)

( * ) Notice: Subject to any disclaimer, the term of this patent is extended or adjusted under 35 U.S.C. 154(b) by 711 days.

(21) Appl. No.: 09/880,925

(22) Filed: Jun. 15, 2001

(65) Prior Publication Data

US 2004/0161487 A1 Aug. 19, 2004

(30) Foreign Application Priority Data

| Jun. 16, 2000 | (JP) | 2000-181314 |
| Mar. 28, 2001 | (JP) | 2001-092764 |
| May 25, 2001 | (JP) | 2001-156393 |
| May 25, 2001 | (JP) | 2001-156394 |

(51) Int. Cl.⁷ .......................... B21D 39/08; B21D 26/02
(52) U.S. Cl. ................. 72/61; 72/62; 72/455; 29/421.1; 29/512
(58) Field of Search ................ 72/60, 61, 62, 72/63, 446, 455; 100/231; 29/421.1, 512

(56) References Cited

U.S. PATENT DOCUMENTS

| 4,018,150 A | * | 4/1977 | Shiokawa | 100/231 |
| 5,211,046 A | | 5/1993 | Inagaki | |
| 5,482,454 A | * | 1/1996 | Miyahara | 100/231 |
| 5,582,052 A | | 12/1996 | Rigsby | |
| 5,600,983 A | | 2/1997 | Rigsby | |
| 5,755,653 A | | 5/1998 | Nishida | |
| 6,018,971 A | * | 2/2000 | Kleinschmidt | 72/61 |
| 6,041,633 A | | 3/2000 | Bieling | |
| 6,536,251 B2 | * | 3/2003 | Marando et al. | 72/61 |
| 6,634,198 B2 | * | 10/2003 | Dudziak | 72/57 |

FOREIGN PATENT DOCUMENTS

| EP | 0 808 674 | 11/1997 |
| JP | (P) Sho 58-119426 | 7/1983 |
| JP | (P) Sho 60-96333 | 5/1985 |
| JP | (P) Hei 05-44396 | 6/1993 |
| JP | (P) Hei 09-174290 | 7/1997 |

OTHER PUBLICATIONS

European Search Report (two pages), dated Sep. 20, 2002, with Annex (two pages), European Patent Application No. 114484.7 corresponding to this application.
Patent Abstracts of Japan, abstract (in English) of JP 05 329693 A.

* cited by examiner

*Primary Examiner*—David Jones
(74) *Attorney, Agent, or Firm*—Kenyon & Kenyon

(57) ABSTRACT

A mold clamping apparatus includes a frame including a holding portion for holding a mold and an open portion allowing the mold to be inserted into/taken out from the holding portion in a direction of the longer side of the mold, a mold moving device for moving the mold to insert/take out the mold into/from the holding portion through the open portion in the frame, and a mold opening/closing device for opening/closing the mold located outside the frame. This mold clamping apparatus is capable of holding the mold securely in a closed state resisting a pressure acting to open the mold and allows reduction of energy consumption, equipment maintenance cost, production cost, and the size thereof.

29 Claims, 27 Drawing Sheets

F I G. 10A
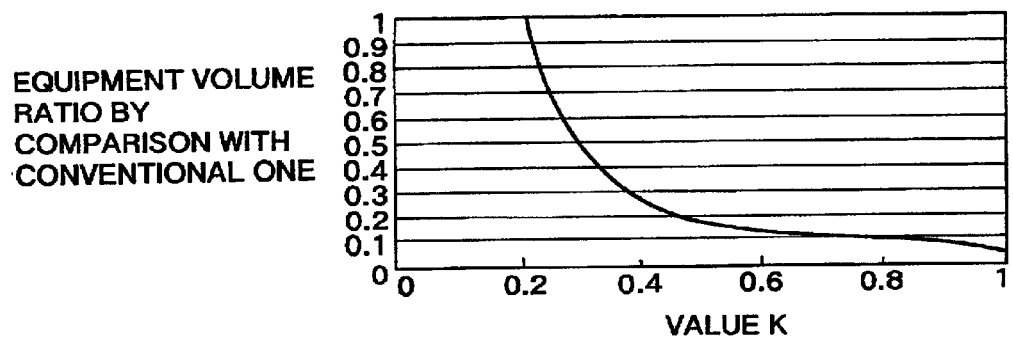
F I G. 10B
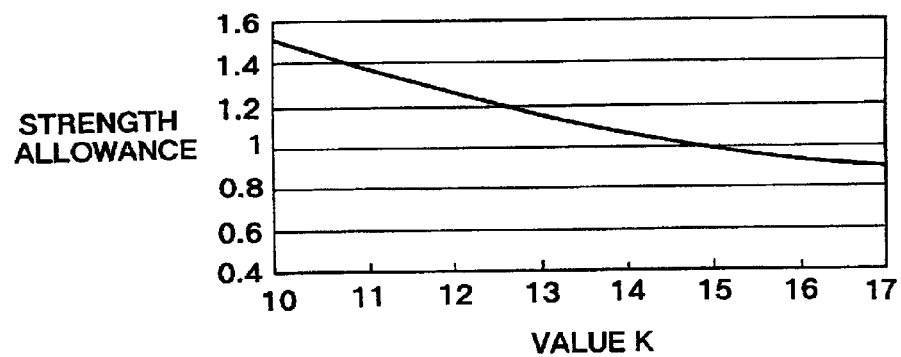

STEEL PLATE CHAMFERED
FOR USE IN INVENTION

NON-CHAMFERED
STEEL PLATE

FIG. 17
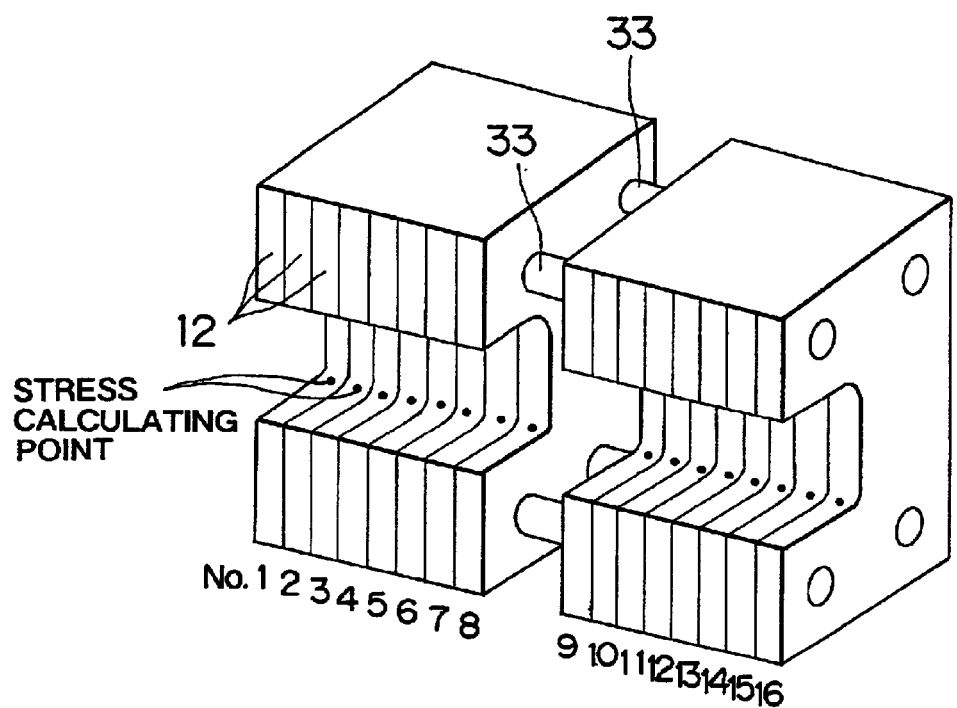
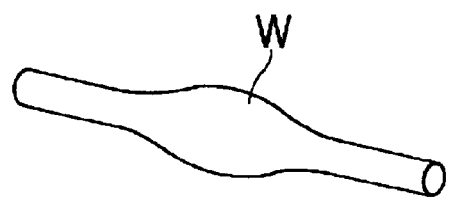

MOLD CLAMPING APPARATUS AND MOLD CLAMPING METHOD

INCORPORATION BY REFERENCE

The disclosure of Japanese Patent Application Nos. 2000-181314 filed on Jun. 16, 2000, 2001-092764 filed on Mar. 28, 2001-156393 filed on May 25, 2001 and 2001-156394 filed on May 25, 2001 including the specification, drawings and abstract is incorporated herein by reference in its entirety.

BACKGROUND OF THE INVENTION

1. Field of the Invention

The invention relates to a mold clamping apparatus and a mold clamping method, and more particularly a mold clamping apparatus for closing and holding molds in which mold opening force is generated by providing inside thereof with a pressure for opening the mold and a mold clamping method using the same.

2. Description of the Related Art

For example, in hydraulic pressure bulging processing, with both ends of a material pipe sealed, the material pipe is formed to a predetermined shape by expanding a diameter thereof or the like by raising the pressure of the liquid charged inside. Generally, the hydraulic pressure bulging processing apparatus comprises high pressure liquid supply device which supplies liquid such as water at a high pressure to the inside of the material pipe, a mold for capturing the periphery of the material pipe and axially pressing device which presses ends of the material pipe in the axial direction. The mold in the hydraulic pressure bulging processing apparatus is divided for accommodating the material pipe inside and taking out a molded product by the hydraulic pressure bulging processing. When carrying out the hydraulic pressure bulging processing by expanding the diameter of the material pipe or the like, a force intending to open the mold (mold opening force) is generated by the pressure of the liquid supplied to the inside of the material pipe. Thus, the mold is provided with a mold clamping apparatus in order to open/close the mold and hold the mold (mold clamping) in a closed state resisting a pressure applied forcing the mold to be opened during molding. As the mold clamping apparatus, generally, a general-purpose hydraulic press has been used. This general-purpose hydraulic press has a sufficiently large capacity with a huge ram and bed so as to be capable of coping with molds of various sizes. In such a general-purpose hydraulic press, columns are erected to support a crown receiving a pressure applied by the ram (for example, see Japanese Patent Laid-Open Publication No. HEI 5-329693).

Products molded by hydraulic pressure bulging processing include not only a straight product also but curved or bent products. Thus, as shown in FIG. 37, the mold 2 is also formed in a curved or bent shape. The hydraulic pressure bulging processing apparatus may be provided with axially pressing device 22 which presses ends of a material pipe in the axial direction, which is provided on ends of the mold 2 such that it is inclined with respect thereto as shown in FIG. 36.

The hydraulic pressure bulging processing may include a case of forming a T-shaped branch pipe from a straight material. In this case, the mold 2 is provided with a back pressure counter cylinder 26 for controlling a back pressure of the branch pipe to be formed, as shown in FIG. 34. The mold 2 includes a portion 2a for accommodating a straight material pipe W and a portion 2b for forming the branch pipe. The axially pressing devices 22 are provided on both end portions of the portion 2a for accommodating the material pipe W. The back pressure counter cylinder 26 is provided at an end of the portion 2b in which the branch pipe is to be formed, such that it is protruded from the mold 2. When forming the branch pipe, first, as shown in FIG. 34A, the material pipe W is disposed in the mold 2 and then, both ends thereof are sealed with the axially pressing devices 22. Liquid such as water is supplied at a high pressure through ends of the material pipe W into the inside thereof from high pressure liquid supply device (not shown) through the axially pressing devices 22, and both ends of the material pipe W are pressed with the axially pressing devices 22. Consequently, as shown in FIG. 34B, the material pipe W is expanded into the portion 2b in which the branch pipe is to be formed. At this time, growth of the branch pipe is controlled with a piston 26a of the back pressure counter cylinder 26 pressing an end of the branch pipe so that a top portion of the expanded branch pipe is not ruptured, such that the piston 26a is retreated synchronously with a supply of liquid into the material pipe W by the high pressure liquid supply device and pressing on both ends of the material pipe W by the axially pressing devices 22, as shown in FIG. 34C.

When drilling a hole in a molded product W', a hole punch 24 (see FIG. 1) is provided in the mold 22 and as shown in FIG. 38, driving cylinders 25 for the hole punch 24 are provided so as to be protruded from the mold 2. Further, a cylinder for driving an ejector may be provided so as to be protruded from the mold 2 in order to take out the molded product W' from an opened mold 2 (not shown). Device each having a specified function necessary for molding such as the back pressure counter cylinder 26, the driving cylinder 25 for the hole punch 24 and a driving cylinder for the ejector are referred to as functional devices.

As for a press frame, as disclosed in Japanese Utility Model No. 5-44396, and the like, a frame 101 having a holed section constructed by laminating plural sheet-like frame materials 112 whose center portion is cut out has been well known (FIG. 39). A central cut-out portion 115 in the press frame disclosed in Japanese Utility Model No. 5-44396 contains a pressure applying cylinder, a pressure receiving member and a mold although a representation thereof is omitted in FIG. 39.

In the hydraulic pressure bulging processing apparatus of the above-described related art, a general-purpose hydraulic press is employed as a mold clamping apparatus. The hydraulic press is provided with a huge ram and bed and further, the entire equipment of the hydraulic press is of a huge construction because it employs a robust structure for preventing distortion of the ram and bed, and the equipment cost becomes accordingly high. Consequently, a large area and height for installing such huge equipment is necessary and further, not only a large amount of operating energy is also necessary, but also there is a problem that the hydraulic pump always has to be driven thereby inducing an energy loss. Further, the hydraulic press takes a long time for opening/closing the mold because the ram is huge. Still further, because in the general-purpose hydraulic press used as a mold clamping apparatus, columns for supporting the ram, crown and the like are erected, it is difficult to secure a good working efficiency in carrying the material pipe W into the mold and taking out a molded product W'.

In the press frame having a closed section whose central portion is cut out as disclosed in Japanese Utility Model NO. 5-44396, for example, its central cutout portion is provided with a pressure applying cylinder and a pressure-receiving member. If this press frame having the closed section is applied to the mold clamping apparatus for the hydraulic pressure bulging processing or the like, the central cut-out portion in the press frame needs to be formed large enough for the pressure applying cylinder to be capable of opening/closing the mold and therefore, the entire size of the press frame becomes large, which is a problem to be solved. In this case, hydraulic pressure driving device and pressure application control device that drives the pressure applying cylinder need to be provided separately from the high pressure liquid supply device that supplies liquid such as water at a high pressure to the inside of the material pipe. Thus, there is a problem that equipment cost is increased and maintenance for the hydraulic driving device is necessary, and it is necessary to control the hydraulic driving device so as to drive the pressure applying cylinder accurately as set up.

In case of the press frame formed to have this closed section, if the central cut-out portion is not provided with any pressure applying cylinder and instead, the mold 2 is held directly by the frame 101 as shown in FIG. 35, the mold 2 can be inserted or taken out only in the longitudinal direction with respect to the frame 101, because the frame 101 is formed with the closed section whose central portion is cut out. Therefore, installation length L has to be as long as a sum of the length of the frame 101 and the length of the mold 2. Further, because the quantity of moving of the mold 2 is increased, it is difficult to reduce the cycle time.

If the mold 2 held by the central cut-out portion 115 in the frame 101 has the axially pressing devices 22 which is inclined with respect to the mold, the central cut-out portion 115 in the frame 101 has to be formed large enough for the axially pressing devices 22 to be capable of passing through as shown in FIG. 36. Therefore, the entire frame 101 needs to be formed sufficiently large. In this case also, the mold needs to be formed with a height T far larger than necessary for the mold 2 to be held by the central cut-out portion 115 formed large (see a portion above two-dot and dash line in FIG. 36)

If a product to be molded by the hydraulic pressure bulging processing is a curved or bent product, the central cut-out portion 115 having a width S allowing a maximum width of the curved or bent mold 2 needs to be formed in the frame 101 as shown in FIG. 37 and therefore, the entire frame 101 has to be formed large.

In case where as shown in FIG. 38, the mold 2 is provided with the functional device such as the back pressure counter cylinder 26, the driving cylinder 25 of the hole punch 24 and the ejector also, the central cut-out portion 115 with a width S which allows the functional device such as the back pressure counter cylinder 26, the driving cylinder 25 of the hole punch 24 and the ejector, protruded from the mold 2 to pass through needs to be formed. As a result, the entire frame 101 has to be formed large.

The frame 101 constructed by laminating sheet-like frame materials 112 whose central portion is cut out as disclosed in Japanese Utility Model No. 5-44396 has a closed section as shown in FIG. 39. Therefore, it is difficult to insert a grinding apparatus and carry out post processing for the central cutout portion 115 to have a smooth surface when the frame materials 112 are laminated. Thus, there is a problem that the central cutout portion 115 in each frame material 112 has to be positioned at a high precision when laminating the frame materials to form a frame.

SUMMARY OF THE INVENTION

Accordingly, an object of the invention is to provide a mold clamping apparatus capable of holding the mold securely resisting a pressure intending to open the mold with a simple structure, improving molding efficiency and achieving compactness of the apparatus.

To achieve the above-described object, according to a first aspect of the invention, there is provided a mold clamping apparatus comprising: a mold in which a mold opening force is generated by applying a pressure for opening the mold to the inside of the mold; a frame including a holding portion for holding the mold resisting the generated mold opening force and an open portion allowing the mold to be inserted into/taken out from the holding portion in a direction of the shorter side of the mold; mold moving device that moves the mold to insert/take out the mold into/from the holding portion through the open portion in the frame; and mold opening/closing device that opens/closes the mold located outside the frame.

Because the mold of the invention is moved in the direction of the shorter side thereof with the mold moving device, it is inserted through the open portion in the frame and held by the holding portion. Further, it is taken out of the frame through the open portion. As a result, the quantity of moving the mold for inserting or taking out the mold into/from the frame is small, so that this is carried out in a short time. As a result, cycle time is reduced and molding efficiency is improved. Although upon molding, a mold opening force is generated when a pressure is applied to the inside of the mold, the mold is held securely in a closed state resisting the mold opening force generated upon molding. When the mold is taken out of the frame from the holding portion through the open portion, the mold is opened/closed with the mold opening/closing device. Because the mold is opened or closed outside the frame, a material or a molded product can be inserted/taken out into/from the mold securely and easily.

According to a preferred embodiment of the invention, the frame comprises an overhang portion and a base portion, composing the holding portion and a post portion for joining the overhang portion to the base portion, and molding parameters of respective portions of the frame are set up so that a stress index value K calculated according to the following expression is in a range of 0.2 to 15:

$$K=\{(6\Phi E/D^2)+(\Phi/D)\}\{1+(0.0188D/C+0.243)(D/R)^{1.13}\}$$

wherein C is a maximum width of the overhang portion; D is a maximum width of the post portion; E is a minimum distance from the post portion to the center in the mold to which a pressure is applied; R is a maximum curvature radius of a connecting corner portion between the overhang portion or base portion and the post portion; and Φ is a width of a projection plane perpendicular to a direction of a mold opening force as a portion to which a pressure in the mold is applied.

By setting up molding parameters of the respective portions of the frame according to the above-described equation, the holding portion in the frame is provided with a pressure so as to hold the mold in which the mold opening force is generated, securely in a stable condition. In case where the mold is used for carrying out hydraulic pressure bulging processing on a material pipe, as for the molding parameters for the frame, E is a minimum distance from the post portion up to the center of the material pipe in the mold and Φ is a width of a projection plane perpendicular to a direction of a mold opening force inside a product formed from the material pipe.

Further, the mold clamping apparatus may further comprise mold closing force application device that applies a force intending to close the mold resisting the mold opening force of the mold.

Although the frame may be elastically deformed so as to be extended slightly depending on a pressure applied to the inside of the mold causing the mold to be opened, the mold closing force application device applies a force for closing the mold resisting the mold opening force and therefore, the mold is prevented from being opened. Consequently, it is possible to form a high precision product reliably.

Further, according to another embodiment of the invention, a mold clamping apparatus comprises: a mold in which a mold opening force is generated by applying a pressure for opening the mold; a frame having a holding portion for holding the mold resisting the generated mold opening force; and mold closing force application device, provided in the holding portion of the frame, that applies a force higher than the mold opening force in a direction of closing the mold using a pressure applied to the inside of the mold.

According to this embodiment, although the mold opening force is generated in the mold when pressure is applied to the inside thereof at the time of molding, the mold is held in a closed state resisting the mold opening force because it is held by the holding portion in the frame. Then, because the mold closing force application device applies a force higher than the mold opening force in the direction intending to close the mold resisting the mold opening force generated by the mold closing force application device, a slight mold opening accompanied by a slight extension due to deformation of the frame is prevented. The mold closing force application device has a simple structure and is easy to control since it uses the pressure applied intending to open the mold for applying this pressure to the mold.

The frame of the above-described embodiment may be constructed by laminating a plurality of sheet-like frames in the longitudinal direction of the frame.

Each frame material is capable of holding the mold resisting a stress applied to the frame material when a pressure applied intending to open the mold is applied. Because each frame material is sheet-like, the open portion and the holding portion are formed easily in each predetermined shape. By adjusting the number of the frame materials, a frame of a desired shape is constructed at a low cost depending on the mold.

Further, the frame materials composing the frame may be so constructed that the strength of the surface is higher than the strength of the central portion in the thickness direction and that the stress concentration portion is chamfered. Further, although decarburized layer still exists on the surface of the frame material, it is possible to remove the decarburized layer on the surface of the frame material in the stress concentration portion by chamfering the stress concentration portion.

Consequently, the strength of the entire frame can be enhanced and reduction of the size and cost can be achieved. Further, reduction of processing cost and improvement of yield rate for steel plate can be achieved.

Further, the frame may be constructed by laminating frame materials each having different strength level and thickness.

Consequently, material having a high strength level is utilized in a maximum stress portion of the frame and inexpensive material having a low strength level is used in a portion in which a low stress is generated. Therefore, there is no waste in material selection, so that production cost can be suppressed.

According to still another embodiment of the invention, there is provided a mold clamping method comprising: preparing a mold in which a mold opening force is generated by applying a pressure for opening the mold to the inside of the mold, a frame containing a holding portion for holding the mold resisting the generated mold opening force and an open portion which allows the mold to be inserted into/taken out from the holding portion in a direction of the longer side of the mold; and inserting the mold into the holding portion through the open portion in the frame by moving the mold in a direction of the shorter side of the mold and closing and holding the mold, and after molding, taking out the mold from the holding portion through the open portion and opening/closing the mold outside the frame.

According to this embodiment, by moving the mold in the direction of the shorter side of the mold, the mold is inserted into the holding portion through the open portion in the frame and held in a condition that it is closed. After the molding, it is taken out from the holding portion through the open portion and then, the mold is opened or closed outside the frame. Such a simple structure achieves reduction of cycle time used for carrying the material into the mold and taking out a molded product, thereby improving working efficiency and molding effectiveness.

BRIEF DESCRIPTION OF THE DRAWINGS

FIG. 10A is a graph showing a volume ratio to a hydraulic press, of a frame formed under formation parameters set up based on a stress index value calculated according to the invention;

FIG. 10B is a graph showing changes to the stress index value, of a strength allowance of a frame formed under formation parameters set up based on a stress index value calculated according to the invention;

FIG. 17 is a perspective view showing an apparatus frame, material and the like according to an embodiment of the invention;

DETAILED DESCRIPTION OF THE PREFERRED EMBODIMENTS

Hereinafter, a case where an embodiment of the invention is applied to a hydraulic pressure bulging processing apparatus for forming a material pipe to a predetermined configuration will be described in detail with reference to FIGS. 1 to 27.

Figure 33:
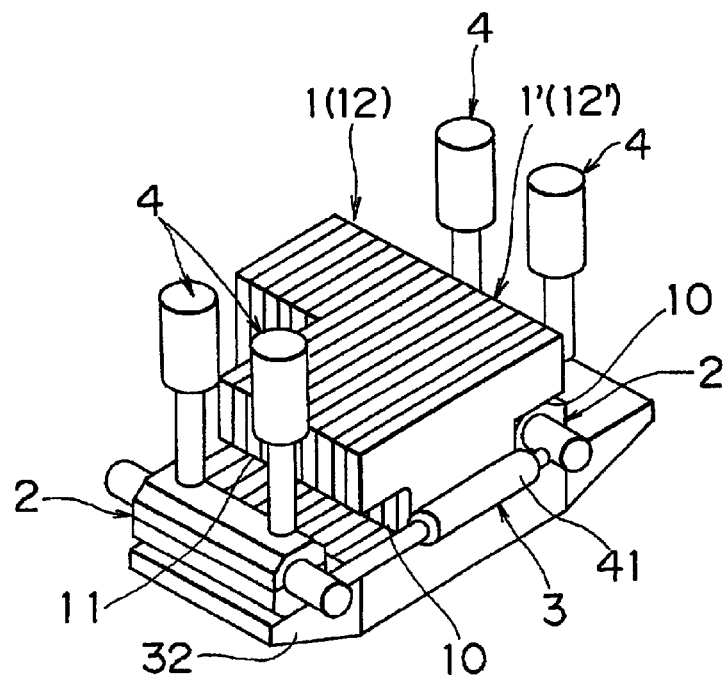
FIG. 33 is a perspective view showing an embodiment in which a frame is comprised of a frame material containing a single holding portion and open portion and a frame material containing plural holding portions and open portions, and a mold starting device is used for both the molds and can be inserted into/taken out from the holding portion in the frame.
Figure 34A:
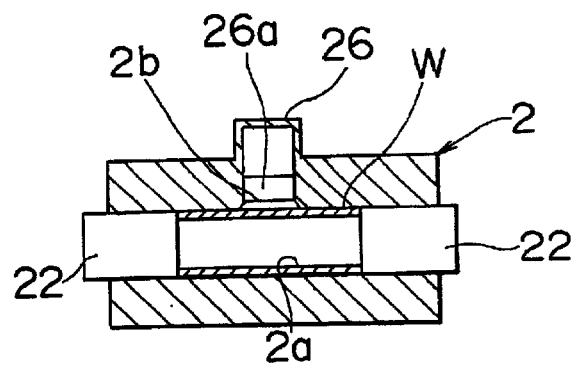
FIG. 34 is an explanatory view showing an operation of a back pressure counter provided for controlling the back pressure in a branch pipe to be formed by hydraulic pressure bulging processing.
Figure 34B:
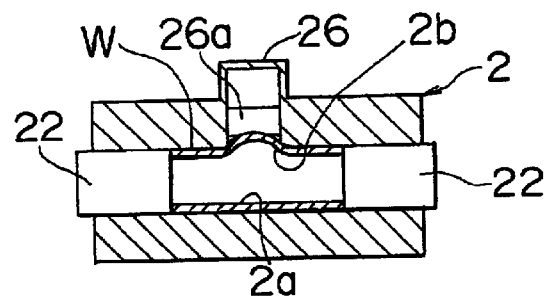
Figure 34C:
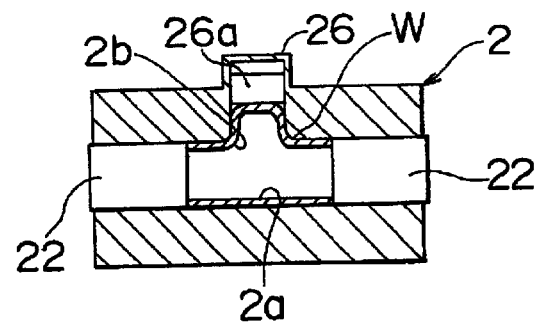

The mold clamping apparatus of the invention has a frame 1 for holding a mold 2 in which a mold opening force is generated when a pressure for opening the mold is applied. The frame 1 comprises a holding portion 10 for holding the mold 2 resisting a mold opening force generated when a pressure for opening the mold is applied inside, and an open portion 11 allowing engagement or discharge of the mold 2 with respect to the holding portion 10 in a direction of the shorter side of the mold. Further, the mold clamping apparatus of the invention comprises mold moving device 3 for inserting or taking out the mold 2 into/from the holding portion 10 in the direction of the shorter side of the mold via the open portion 11 of the frame 1 and a mold opening/closing device 4 for opening/closing the mold 2 located outside the frame 1. The mold moving device 3 and the mold opening/closing device 4 are illustrated in FIG. 33.

Figure 30:
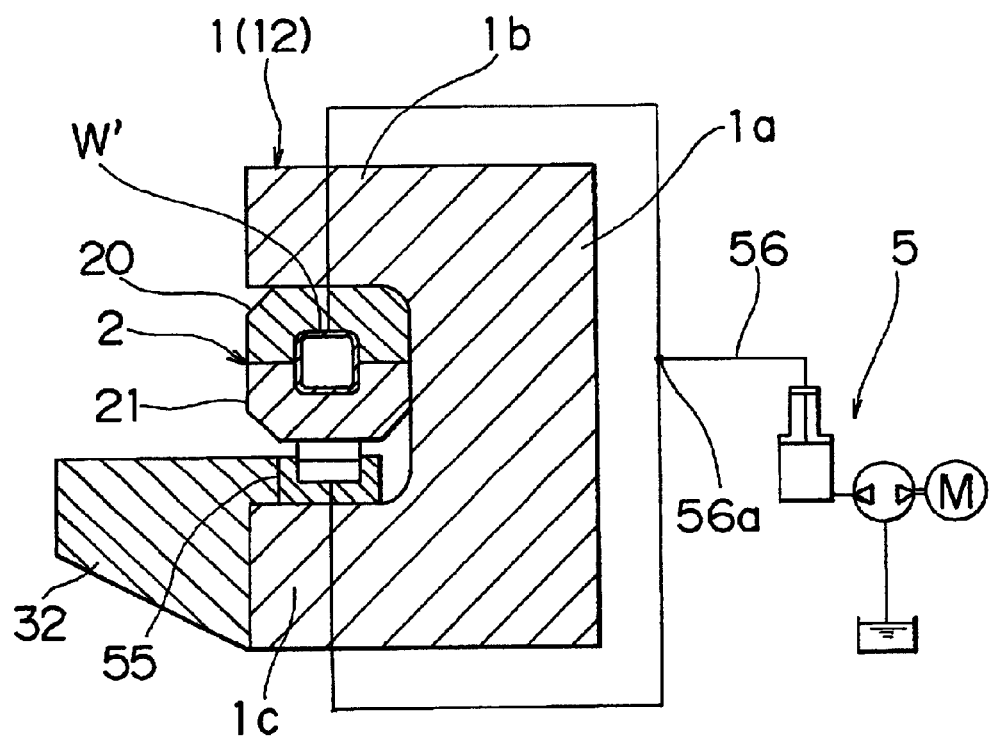
FIG. 30 is a schematic diagram for explaining a state in which a pressure for canceling the mold opening force in the mold is applied by simultaneously supplying liquid into the inside of a material pipe and a cylinder of the mold closing force application device from high pressure liquid supply device.
Figure 31:
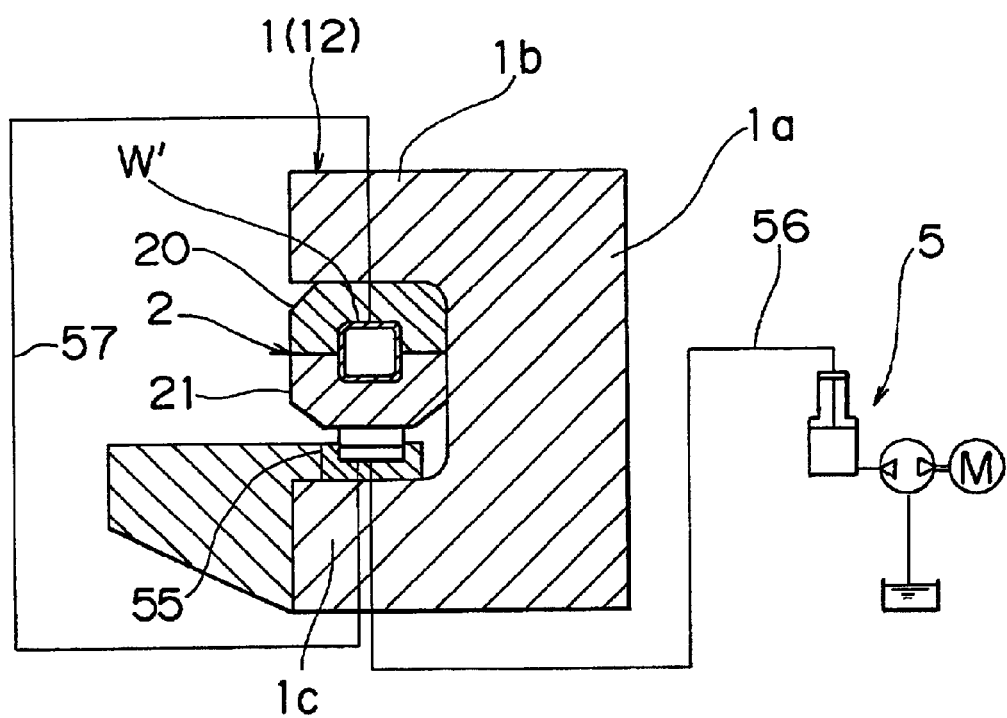
FIG. 31 is a schematic diagram showing a structure of another embodiment of the mold closing force application device of the invention.

As shown in FIGS. 4 to 7, the mold 2 is used for carrying out hydraulic pressure bulging processing on a material pipe W and comprises an upper mold 20 and a lower mold 21. They have accommodating portions 20a, 21a respectively for capturing the material pipe W and forming it to a predetermined shape, the accommodating portions being provided in abutting faces therebetween. The accommodating portions 20a, 21a in the mold 2 of this embodiment are formed so as to form a molded product W' having a rectangular section from the material pipe W having a circular section. Axially pressing device 22 is provided on each end of the mold 2. An end of each axially pressing device 22 is inserted into end portions of each of the accommodating portions 20a, 21a so as to press end portions of the material pipe accommodated in the accommodating portions 20a, 21a. Both ends of the material pipe W are sealed. Thus, high pressure water can be supplied from high pressure liquid supply device 5 into inside of the material pipe W and air in the material pipe W can be discharged. The high pressure liquid supply device 5 shown in FIG. 30 is connected to the axially pressing device 22 of FIG. 22. The high pressure liquid supply device 5 supplies liquid such as pressurized water to inside of the material pipe W which is accommodated in the accommodating portions 20a, 21a with both ends thereof sealed, through the axially pressing device 22.

Figure 1:
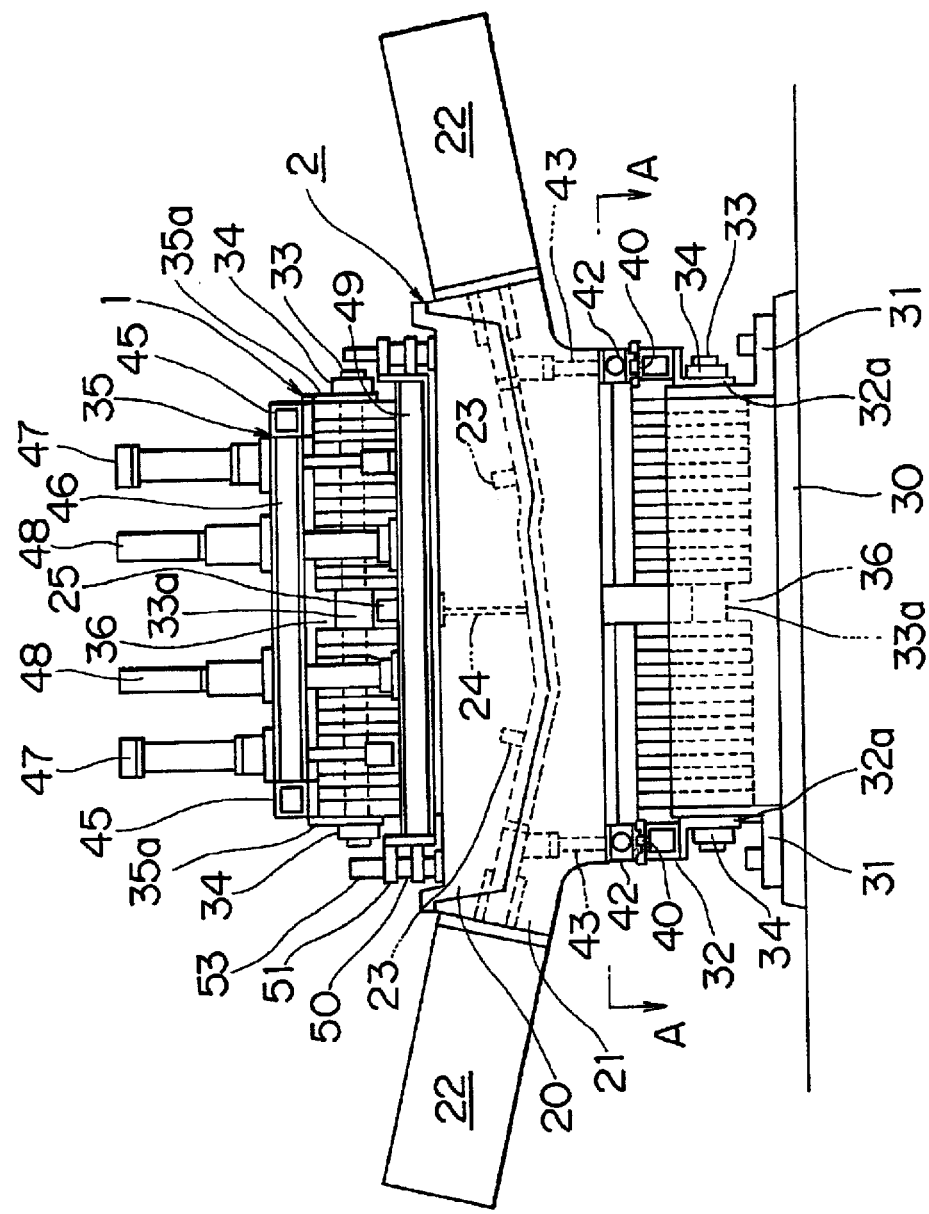
FIG. 1 is a front view showing an embodiment of a mold clamping apparatus of the invention.

The mold 2 of this embodiment further comprises a molded product pushing cylinder (ejector unit) 23 for taking out a molded product W' having a rectangular section from the accommodating portion 20a, a hole punch 24 and a driving cylinder 25 (piercing unit), as function device as shown in FIG. 1. The driving cylinder 25 of the hole punch 24 is provided such that it is protruded from the mold 2.

Figure 6:
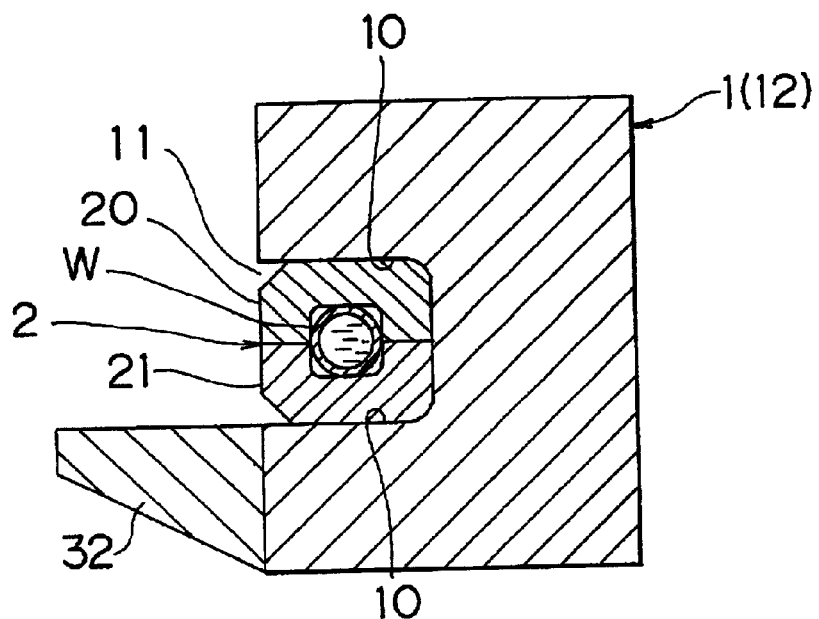
FIG. 6 is a sectional view for explaining a state in which the mold is inserted into a holding portion through an open portion from the state shown in FIG. 5 such that it is held thereby.
Figure 7:
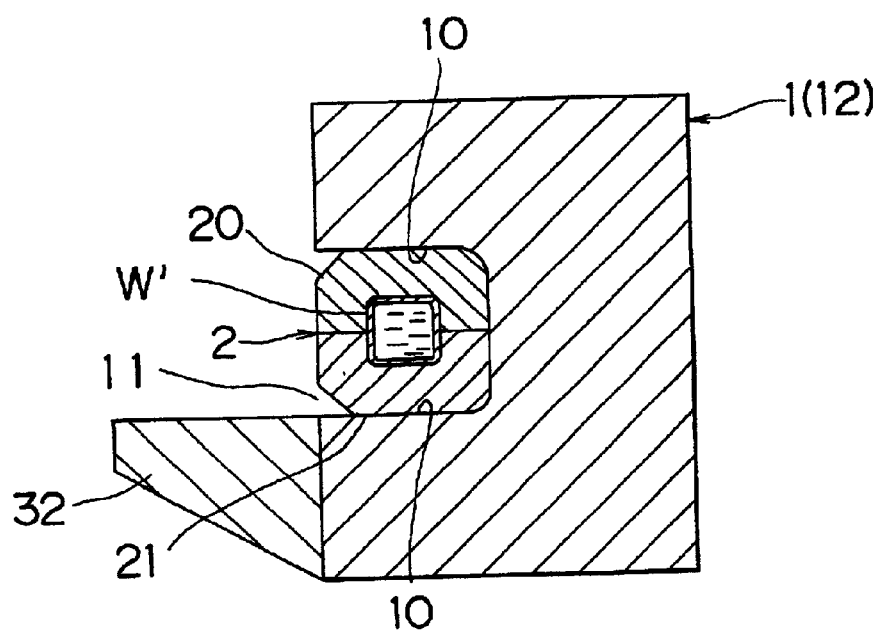
FIG. 7 is a sectional view for explaining a state in which liquid is supplied to the inside of a material pipe at a high pressure so that a molded product is finished.
Figure 8:
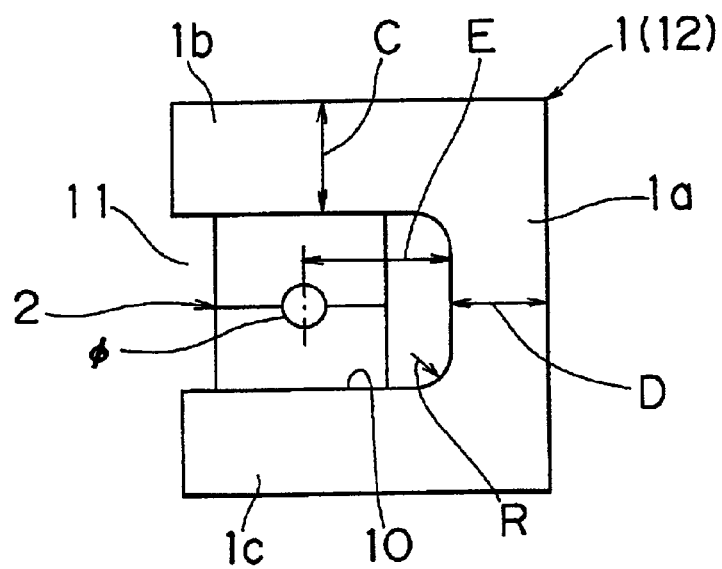
FIG. 8 is a schematic diagram for explaining the shape of a frame to be set.

On the other hand, according to the embodiment shown in FIGS. 4 to 7, the frame 1 is formed so as to have a C-shaped section which is cut out from one face up to its center. Here, as shown in FIG. 8, a vertical portion of the frame 1 is called post portion 1a, an upper horizontal portion connected to this post portion 1a is called overhang portion 1b while a lower horizontal portion connected to the post portion 1a is called base portion 1c. The overhang portion 1b and the base portion 1c are formed substantially parallel to each other in terms of their opposing faces, so that a holding portion 10 of the frame 1 is constructed with such parallel opposing faces. The open portion 11 of the frame 1 is constructed between ends of the overhand portion 1b and base portion 1c.

Figure 39:
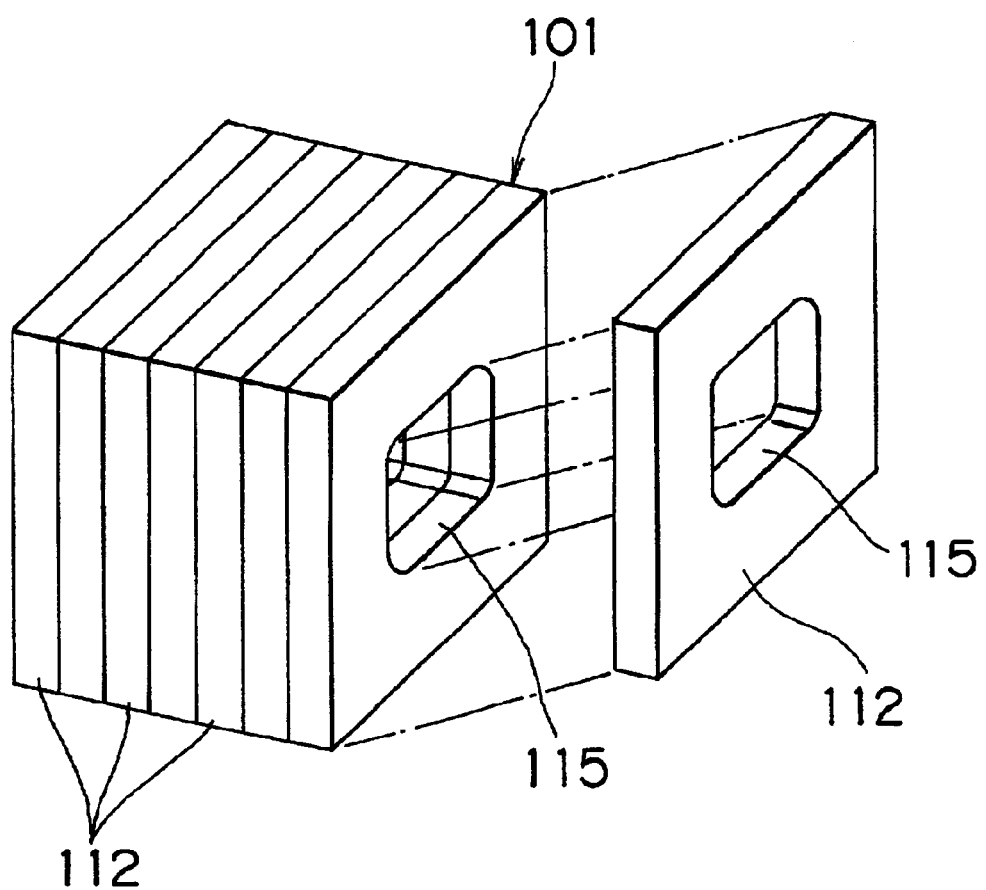
FIG. 39 is a perspective view for explaining a frame having a closed section constructed by laminating sheet-like frame whose central portion is cut out.

The frame 1 of this embodiment is formed by laminating a plurality of frame materials 12. Each frame material 12 is formed in the shape of a plate such that the holding portion 10 and the open portion 11 are made as in the above described embodiment. Each frame material 12 is composed of a rectangular rolled sheet material and by cutting out from one side edge toward the center, the holding portion 10 and the open portion 11 can be formed easily at low cost. Further, because in the frame 1 of the invention, each frame material 12 has the open portion 11 unlike a frame 101 having a closed section as indicated by a related art of FIG. 39, a grinding processing unit can be brought to the holding portion 10 easily. Accordingly, post processing for finishing the surface of the holding portion 10 and the open portion 11 smooth after laminating the frame materials 12 is facilitated. Therefore, it is not necessary to position and laminate the frame materials 12 at high precision such that the holding portion 10 and the open portion 11 have a continuous smooth surface. In the meanwhile, the frame 1 of the invention is not restricted to this structure formed by laminating a plurality of plate frame materials, but may be formed in the form of an integrally molded block.

Figure 5:
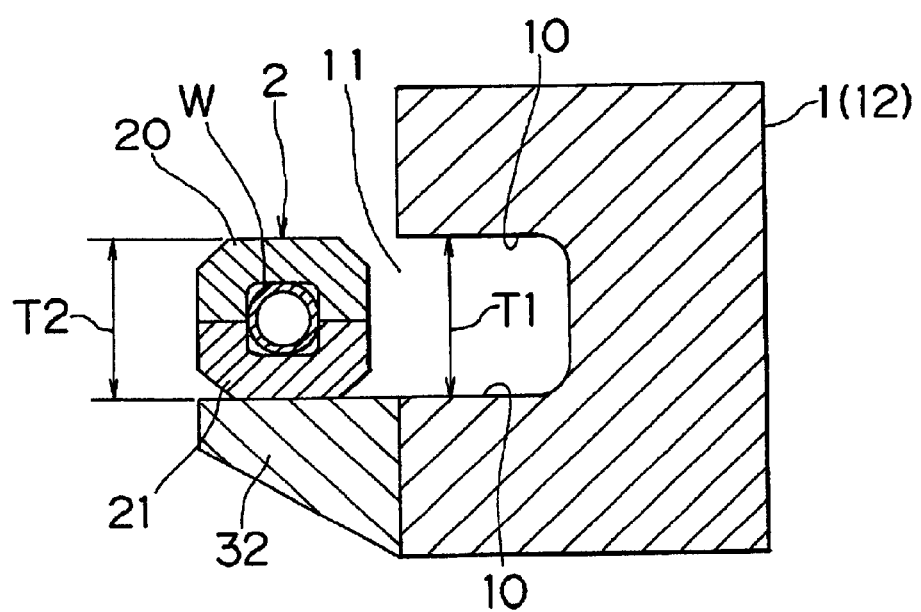
FIG. 5 is a sectional view for explaining a state in which the mold is closed from the state shown in FIG. 4.

As shown in FIG. 5, an interval T1 of the holding portion 10 is set up a little wider than the height T2 of the mold 2 so that the mold 2 in which a mold opening force is generated can be held securely and engaged by insertion. Meanwhile, the invention is not restricted to this embodiment, but may have an H-shaped section in which the holding portion 10 and the open portion 11 are formed on each of two faces opposing each other of the frame 1. Although not shown, the invention may be formed so as to have an E-shaped section in which plural open portions 11 and holding portions 10 continuous thereto are arranged on a side face.

Next, setting of molding parameters for the frame of the invention will be described.

Figure 9:
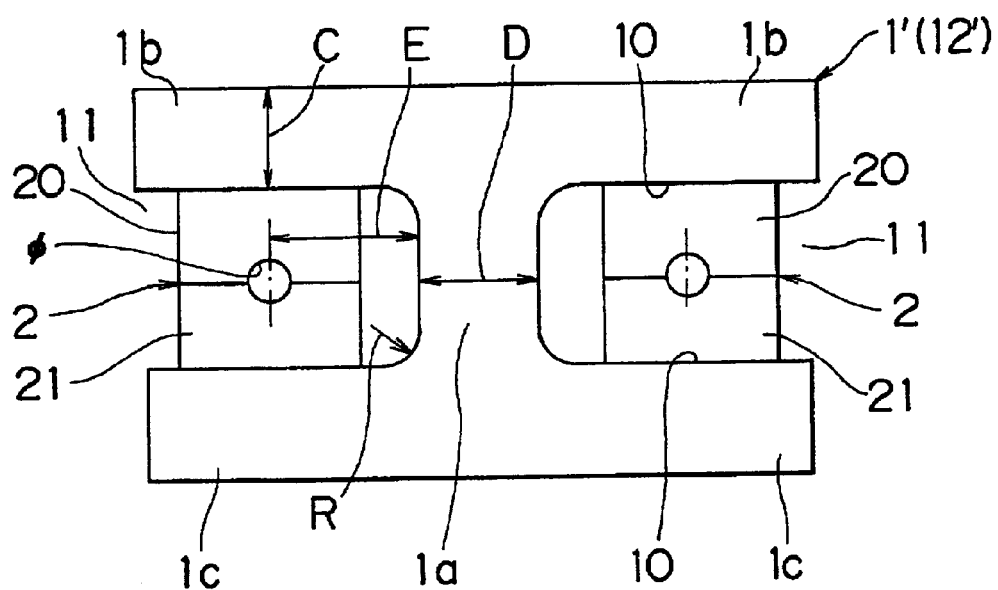
FIG. 9 is an explanatory diagram showing another embodiment provided with plural holding portions and open portions.

As shown in FIGS. 8 and 9, as the molding parameter for the frame, assuming that a maximum width of the overhand portion 1b is C(m), a maximum width of the post portion 1a is D(m), a minimum distance from inside of the post portion 1a to the center of the material pipe W in which high pressure fluid is supplied internally is E(m), a maximum curvature radius of part between the post portion 1a and the overhand portion 1b or the base portion 1c is R(m), a maximum width of a projection plane perpendicular to a direction of a mold opening force generated in the mold 2 inside the product W' as a portion to which a pressure in the mold is applied is Φ(m), and a maximum arrival pressure to be applied to inside of the material pipe is P(Pa), experiments were carried out with frames of various shapes. Consequently, the inventor found that a stress index value K which was a ratio between the maximum arrival pressure P and the maximum stress σ(Pa) to be applied to the frame could be obtained by the following equation.

$$K=\sigma P=\{(6\Phi E/D^2)+(\Phi/D)\}(1+(0.0188D/C+0.243)(D/R)^{1.18})]$$

With respect to an estimated value of the stress index value K obtained from this equation, contribution of an observed value obtained through experiment is 0.965. If the overhand portion 1b, the base portion 1c and the post portion 1a are formed along straight line without forming the connecting corner portion with curvature, 0 is substituted for the D/R in the above equation.

FIG. 10A is a graph showing a relation between the calculated stress index value K and a ratio between a volume of a frame formed with molding parameter set up by the invention and the volume of a general-purpose hydraulic press explained in related art. If the molding parameter is set up so as to increase the stress index value K, the volume of the frame 1 can be reduced. As evident from this graph, if the calculated stress index value K is substantially more than 0.2, the volume of the frame 1 of the invention can be reduced as compared to the volume of the general-purpose hydraulic press.

FIG. 10B is a graph showing a relation between the calculated stress index value K and an allowance (safety rate) of the strength of the frame formed with the molding parameter set up by the invention. If the molding parameter is set up so as to increase the stress index value K, the excess rate of the strength of the frame 1 is decreased. As evident from this graph, if the calculated stress index value K was substantially less than 15, it was found that there is no problem in the strength of the frame 1 of the invention.

Thus, according to the invention, the maximum width C of the overhang portion 1b, the maximum width D of the post portion 1a, the minimum distance E from inside of the post portion 1a up to the center of the material pipe W, and the maximum curvature radius R of the connecting corner portion between the post portion 1a and the overhang portion 1b or the base portion 1c as the molding parameter of each portion of the frame so that the stress index value K calculated from the above equation is in a range from 0.2 to 15. Consequently, the frame 1 can obtain an optimum frame configuration which achieves compactness in its volume, avoids plastic deformation by a mold opening force of the mold 2, ensures a strength capable of holding the mold 2 in a stable condition and endures a fatigue to a repeated load by the mold opening force of the mold 2 in continuous molding cycle.

If the mold opening force is generated, a reaction force is applied to the frame 1 upward in a single axis direction, so that a bent portion of the frame 1 becomes a stress concentration portion 5. According to the conventional related art, material ensuring a strength capable of preventing a damage of this stress concentration portion is selected and the entire frame is formed of that material.

According to this embodiment, as the frame material 12, a frame material 12 in which the strength of its surface is higher than the strength of the central portion thereof is used. Such a frame material 12 can be manufactured easily by hardening the surface layer by quenching the surface and conditioning the composition thereof. Although for example, in an ordinary frame material 12 having a strength 590 MPa, the surface and the central portion of the frame 12 have entirely uniform strength of 590 MPa, the central portion of the frame material 12 can be 540 MPa while that of the surface thereof can be 640 MPa by quenching and tempering the surface.

Figure 11:
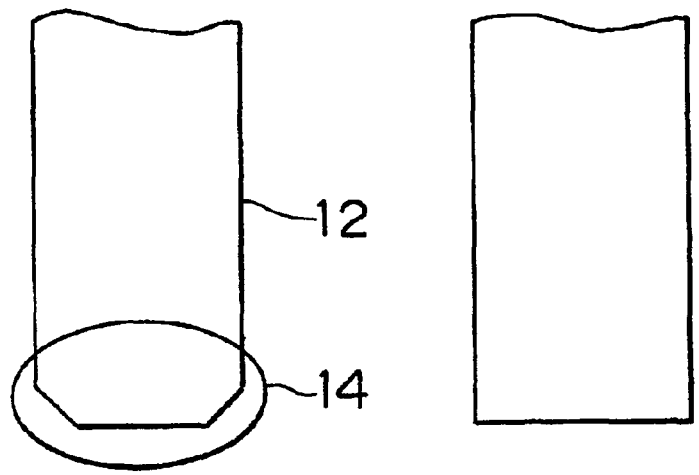
FIG. 11 is a sectional view of a frame plate in a stress concentration portion.
Figure 12:
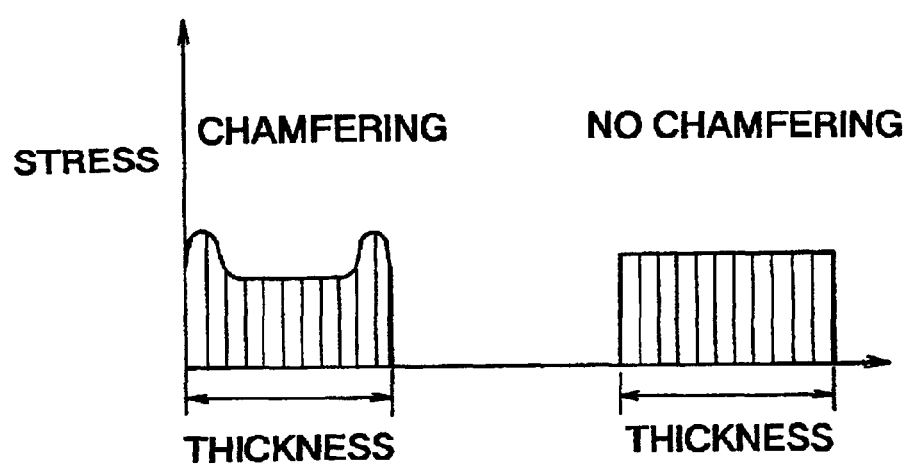
FIG. 12 is a graph showing a stress distribution.

A stress concentration portion 14 in the frame material 12 is chamfered as shown in FIG. 11. Because a single axis stress is generated in the frame 1 as described above, if the chamfering is not carried out, a uniform stress is generated on the entire frame, so that the central portion of the frame material 12 is required to have a strength capable of bearing that stress. If the chamfering processing is carried out, stress distribution is intensified in the chamfered portion more than the central portion of the frame material 12, so that stress bearing of the central portion of the frame material 12 is reduced correspondingly.

Thus, by limiting a portion in which maximum stress occurs in the stress concentration portion 14 to the surface portion of each of the laminated frame materials 12 and adjusting the strength of the surface portion of each frame material 12 so as to be capable of bearing this stress, fatigue strength of an entire frame can be ensured. That is, as compared to a case of manufacturing the entire frame of uniform material capable of bearing maximum stress of the stress concentration portion, evidently, production cost thereof is lower and further the frame 1 can be reduced in size by an amount corresponding to improvement of the surface strength, thereby leading to reduction of production cost as well.

Figure 13:
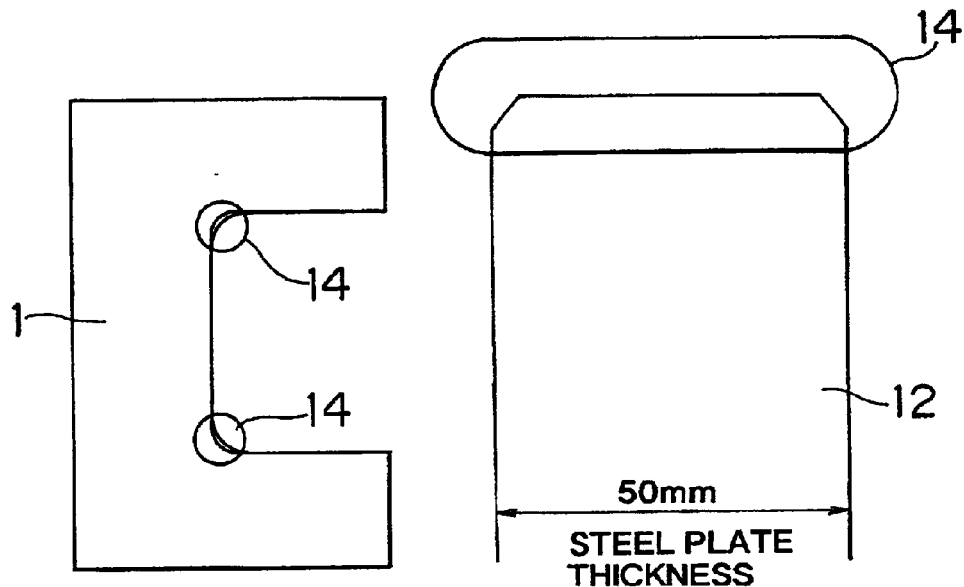
FIG. 13 is a front view of a frame material applied for a hydraulic molding apparatus.
Figure 14:
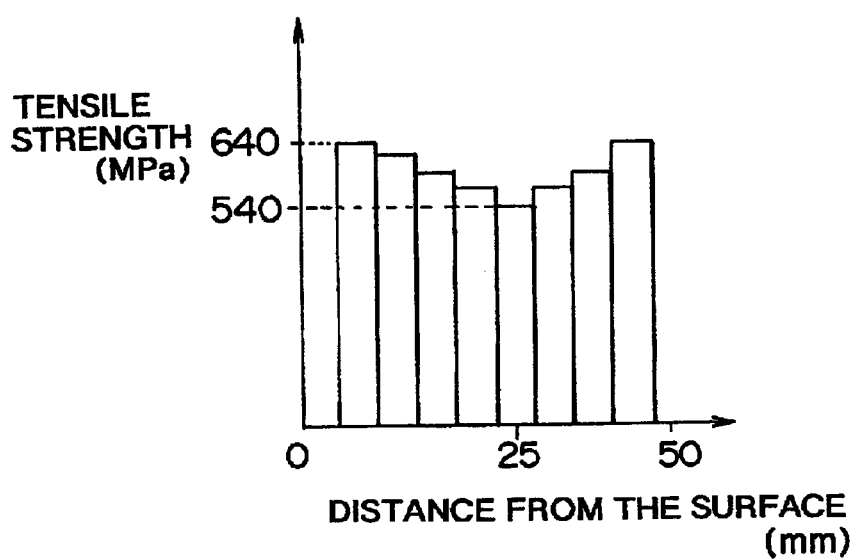
FIG. 14 is a graph showing a strength distribution of the frame material.

For example, in case of constructing the frame 1 shown in FIG. 13 by laminating the frame materials 12 each having a thickness of 50 mm, if a conventional uniform frame material 12 having a strength of 590 MPa is employed, the frame material needs to be 1500 mm in height, 1,000 mm in depth and 1500 mm in width and the weight thereof is 13.6 tons. If the strength of the surface portion is raised to 640 MPa as shown in FIG. 5 by quenching the surface of the frame material 12 having the strength of 540 MPa in the central portion thereof and only the stress concentration portion 5 of the frame material 12 is chamfered by 1 mm each from both sides, the frame can be formed 1360 mm in height, 960 mm in depth and 1500 mm in width, so that the weight thereof can be reduced to 11.3 tons.

Thus, the size of the frame under the same service condition can be reduced and the frame 12 itself to be used may be of an inexpensive material having a low strength level. Therefore, production cost can be greatly reduced.

As shown in the figure as an embodiment of another frame material, a frame material 12 in which decarburized layer (ordinarily, about 0.2 to 0.5 mm) remains is employed. That is, each frame material 12 is a frame material 12 just rolled with scale remaining or a frame material 12 from which the scale in the surface layer is removed by blasting or the like. A material from which the decarburized layer is not removed by cutting or grinding is used. Such a frame material 12 is inexpensive and because there is no portion to be ground, the yield rate of the frame material 12 is increased.

Figure 15:
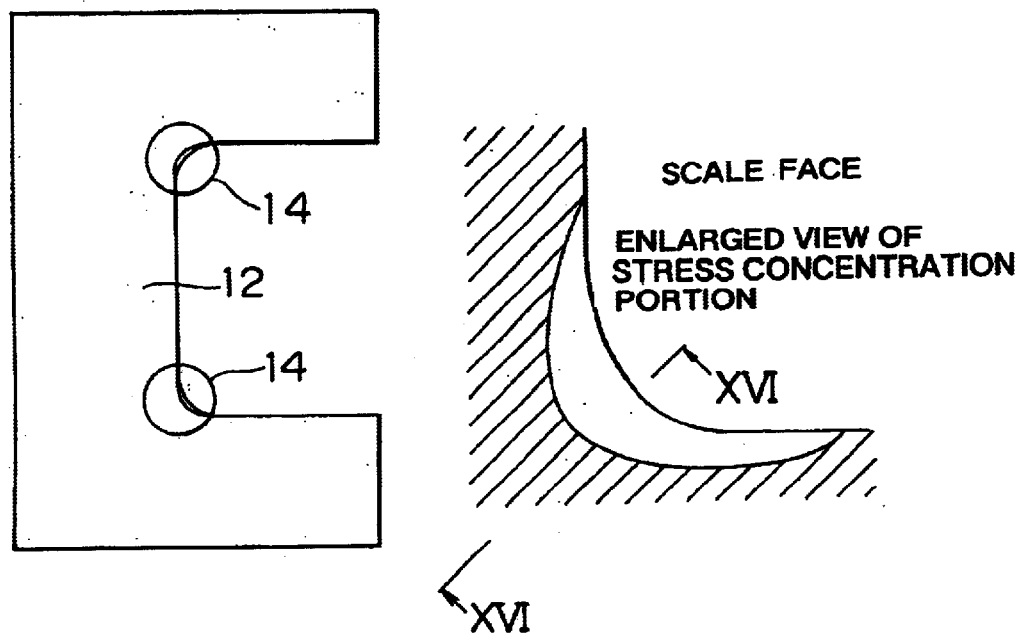
FIG. 15 is a front view of a frame material according to another embodiment.
Figure 16:
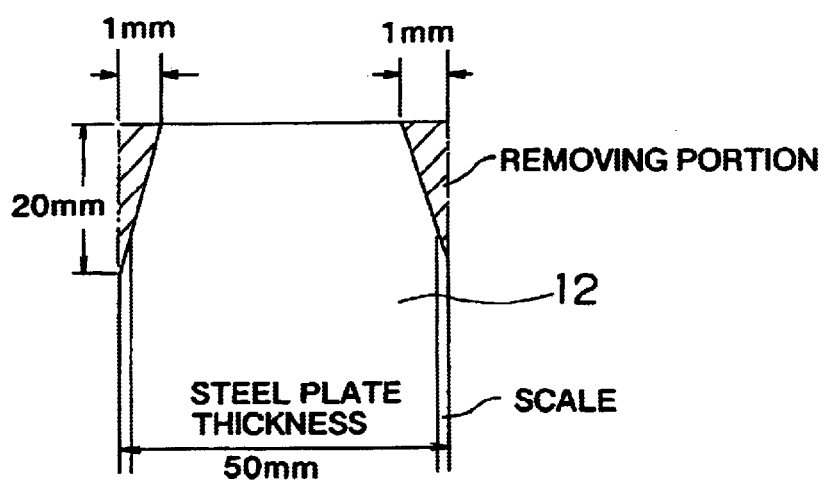
FIG. 16 is a sectional view (taken along the line XVI—XVI in FIG. 15) of a frame material in the stress concentration portion.

However, because as well known, the decarburized layer and scale have a low strength as compared to other portions so that they are brittle, the surface portion of the frame material 12 is likely to become a rupture starting point if nothing is done. By chamfering the stress concentration portion 14 of each frame material 12 as shown in FIGS. 15, 16, the decarburized layer in the surface layer of the frame material 12 in the stress concentration portion is removed. In this example shown in FIG. 16, by chamfering each 50 mm-thick frame material 12 obliquely by 1 mm in width and 20 mm in depth, the chamfered portion in the stress concentration portion 14 is treated such that the scale and decarburized layer having a low strength are not exposed.

In case of constructing a frame by laminating frame materials 12 each having a strength of 590 MPa with the scale (because in case of the frame material 12 of this embodiment, the strength drops by about 20% as described above), the frame under the same condition as the above-mentioned one needs to be 1500 mm in height, 1190 mm in depth and 1500 mm in width, so that the weight thereof is 16.9 tons. However, if the chamfering processing is carried out, the frame can be designed with the strength of the stress concentration portion being 590 MPa, so that with the height of 1500 mm, the depth of 1000 mm and the width of 1500 mm, the weight thereof can be reduced to 13.6 tons.

Further, by removing only the scale and decarburized layer in the vicinity of the stress concentration portion instead of cutting or grinding an entire surface or blasting the entire surface, the strength can be improved. Thus, production cost can be greatly reduced without reducing a necessary strength.

In the frame material of this embodiment, the strength of the surface is higher than the strength of the central portion in the thickness direction of the frame material and further, the stress concentration portion of the frame material is subjected to the chamfering processing. Therefore, the strength of the entire frame is enhanced, thereby achieving reduction of the size thereof and production cost. Further, by using a frame material from which the decarburized layer in the surface layer is removed, reduction of the processing cost and improvement of the yield rate of the frame material can be achieved.

Further, by generating a residual compressive stress in a tensile stress concentration portion of each frame material 12 by peening processing or quenching, stress generated during use can be relaxed.

In an apparatus frame 1 shown in FIG. 17, for example, 16 pieces of the frame materials 12 having the same shape are laminated and bound with plural rods 33 running through them horizontally. An opening reaction force acting on the frame material 12 located in the vicinity of the central portion in the laminating direction is large, while a reaction force acting on frame materials located on both ends is smaller as compared to the central portion.

Figure 18:
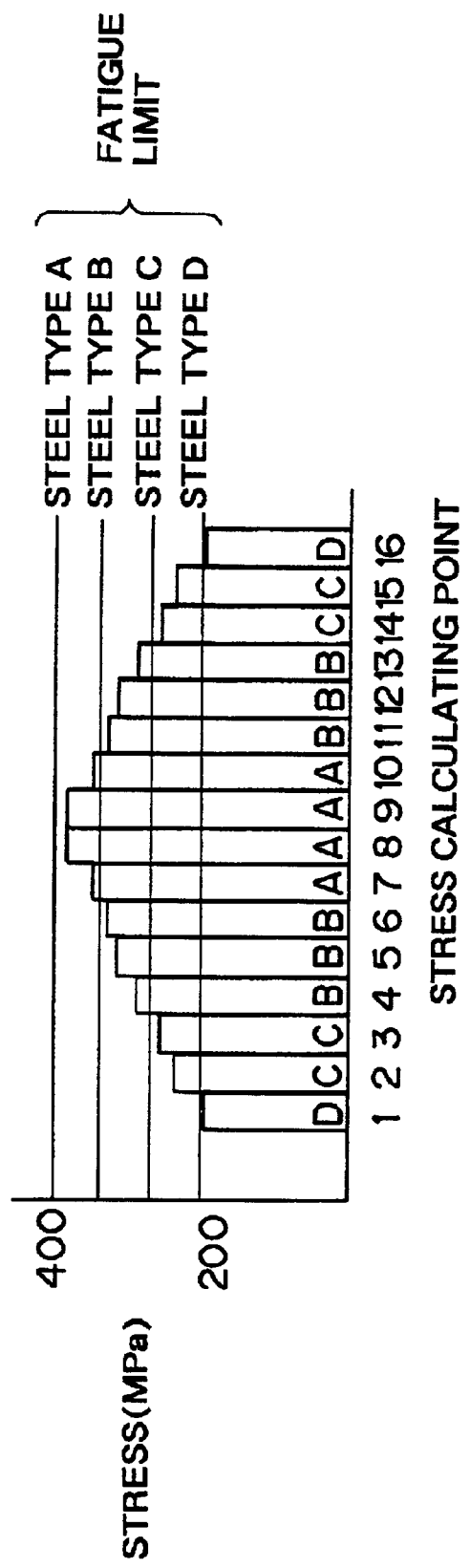
FIG. 18 is a graph showing a relation between a stress at a stress calculation point in each steel plate and fatigue limit of the steel plate used.

FIG. 18 is a graph showing a stress at the stress calculation point (maximum stress generation point) at 16 shown in FIG. 17. In this example, although a stress of 385 MPa is generated in the central portion of the apparatus frame 1, only a stress of 198 MPa is generated on each of both ends. Thus, steel type A whose fatigue limit is 400 MPa is used for four frame materials 12, Nos. 7, 8, 9, and 10 located in the center, steel type B whose fatigue limit is 350 MPa is used for every three frame materials 12 on both sides thereof, steel type C whose fatigue limit is 280 MPa is used for every two frame materials 12 on both sides thereof and steel type D whose fatigue limit is 200 MPa is used for the frame material 12 No. 1 located on each of both ends.

Because the frame materials 12 having various strength levels are laminated in this manner, every portion of the apparatus frame 1 is constructed of materials having fatigue limit exceeding a stress generated upon use. Therefore, even if it is used repeatedly for a long term, the apparatus frame 1 is never deformed or damaged. Further, any material having an excessive strength level is never applied to a portion in which a generated stress is small, thereby making it possible to select materials reasonably. Thus, by using inexpensive material for a portion whose requested strength level is low, the production cost can be reduced.

Figure 19:
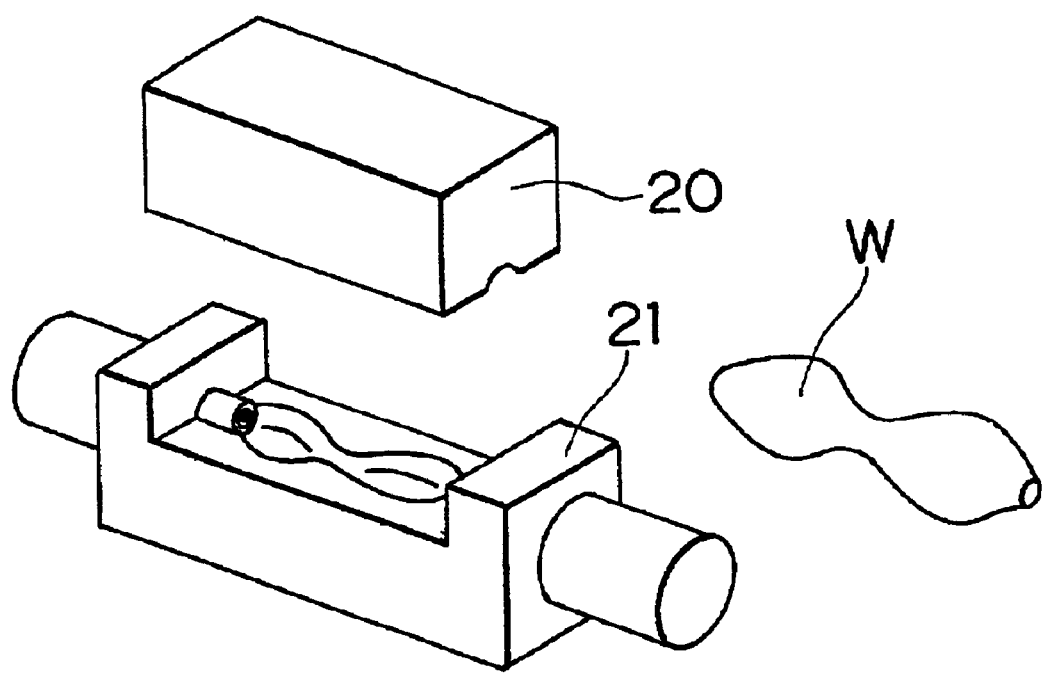
FIG. 19 is a perspective view showing an apparatus frame and mold according to still another embodiment.
Figure 20:
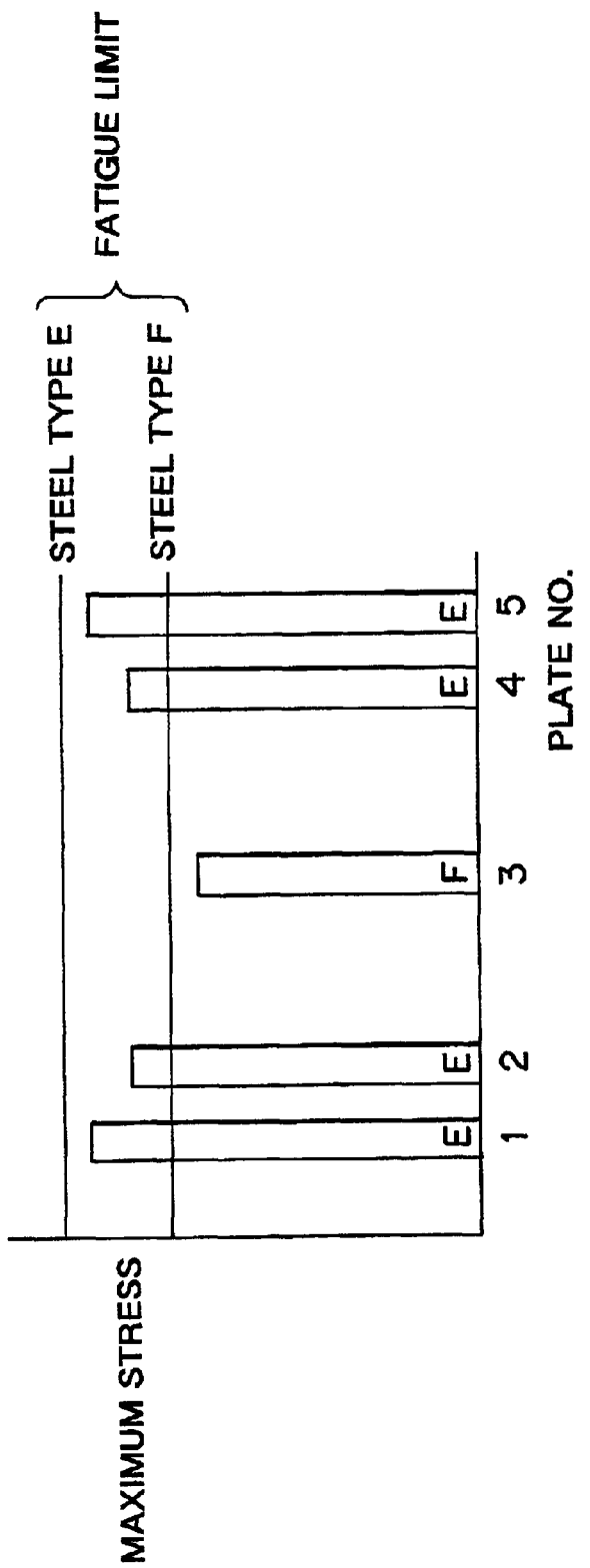
FIG. 20 is a graph showing a relation between a maximum stress in each frame plate and fatigue limit in the frame plate used.
Figure 21:
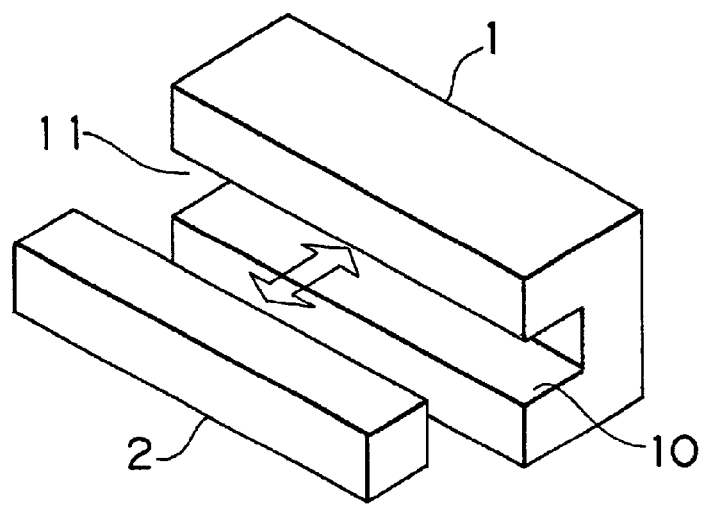
FIG. 21 is a perspective view for explaining a state in which the mold is held in the mold clamping apparatus of the invention.

In another embodiment shown in FIG. 19, the material pipe W which is to be inserted into the mold 2 and formed with fluid pressure is guitar-shaped, so that maximum mold opening force is applied to both sides rather than the central portion. FIG. 20 is a graph showing a maximum stress generated in the apparatus frame 1, such that a large stress is generated on each of both sides.

Accordingly, in this embodiment, the apparatus frame 1 is constructed by laminating five frame materials 12 each having different thickness and strength level. That is, material 200 mm in thickness having a low fatigue limit (steel type F) is employed for the central portion, while material 50 mm in thickness having a high fatigue limit (steel type E) is employed for every two pieces located on both sides. FIG. 5 shows a relation between the fatigue limit and maximum stress of each material.

By varying the thickness together with the strength level so that a thick material easy to produce is employed for a portion whose necessary strength level is low while a thin one is employed for a portion whose necessary strength level is high, the number of laminated pieces can be reduced thereby achieving reduction of production cost. Because a steel plate having a high strength level requires a high production cost due to addition of alloy element and is difficult to be manufactured in the form of a thick plate, such a combination is reasonable and production cost for the entire apparatus frame can be suppressed.

Figure 2:
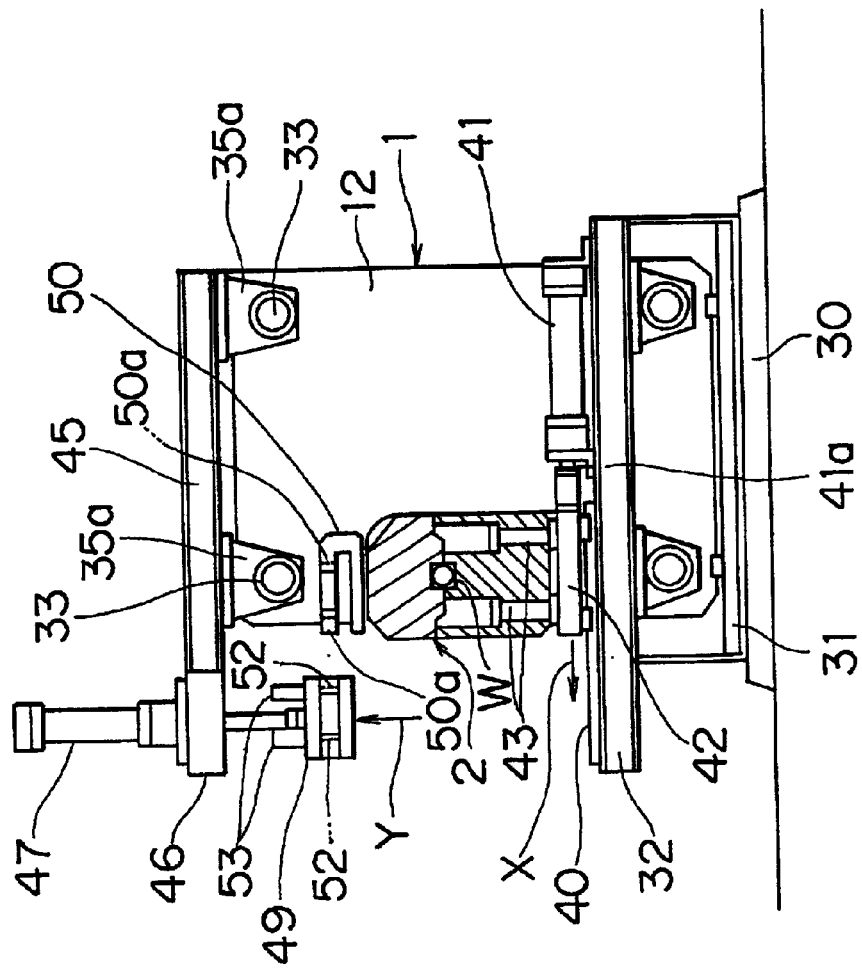
FIG. 2 is a side view of FIG. 1.
Figure 3:
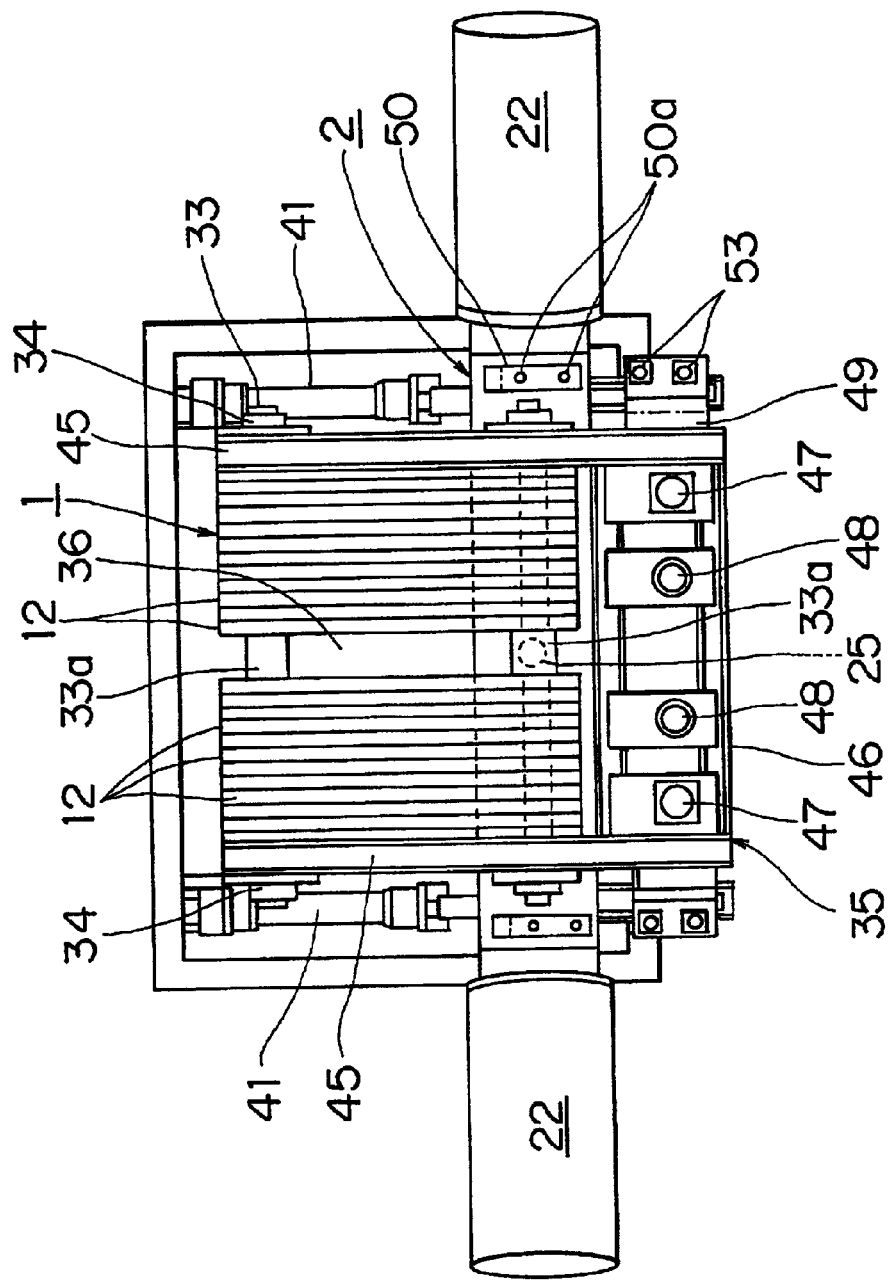
FIG. 3 is a plan view of FIG. 1.

As shown in FIGS. 1 to 3, a pair of supporting flanges 31, right and left are disposed on top face of a base 30 fixed on the floor. A plurality of the frame materials 12 in sheet form are arranged such that they are laminated between the both supporting flanges 31. Flanges 32a of a supporting base 32 are disposed outside the both supporting flanges 31. A connecting rod 33 is inserted through each supporting flange 31 and the flange 32a of the supporting base 32 and lower portion of the frame materials 12, and by tightening a nut 34 to each end of the connecting rod 33, the frame materials 12 and the supporting base 32 are supported by the supporting flange 31. Further, a flange 35a of a supporting frame 35 is disposed at an upper position of an end face of the laminated frame material 12 and the connecting rod 33 is inserted through the upper portion of each frame material 12 and the flange 35a of the supporting frame 35. By tightening a nut 34 to each end of the connecting rod 33, the supporting frame 35 is supported above the frame materials 12. According to this embodiment, a spacer 33a is provided substantially in the center of the connecting rod 33 so that a space 36 is formed between frame materials adjoining in the center in the width direction (right and left direction in FIGS. 1 and 3) of the frame material 1. When the mold 2 is held by a holding portion 1a of the frame 1 as described later, the driving cylinder 25 of the hole punch 24 provided in the mold 2 is accommodated in the space 36.

The mold moving device 3 for inserting or taking out the mold 2 in the direction of the shorter side of the mold into/from the holding portion 10 via the open portion 11 of the frame 1 has the following structure. The supporting base 32 supported by the respective supporting flanges 31 is beam-like extending in the right and left direction of FIG. 2 and a guide rail 40 is provided on a front end side (left side of FIG. 2) of top face thereof, while a single rod type driving cylinder 41 is provided on a rear end (right side of FIG. 2). A slider 42 is supported slidably on the guide rail 40 and an end of a piston rod 41a of the driving cylinder 41 is coupled to the slider 42. According to this embodiment, guide pins 43 are erected from top face of the slider 42 and the guide pins 43 are inserted through both ends of the lower mold 21 so that they are supported by the slider 42 such that they can be lifted up. By extending the driving cylinder 41, as indicated by an arrow X in FIG. 2, the mold 2 supported by the slider 42 is moved in the traverse direction so as to take out the mold 2 from the frame 1. Further, by retracting the driving cylinder 41, the mold 2 supported by the slider 42 is moved in the traverse direction so as to insert the mold 2 into the frame 1. Although according to this embodiment, a case where piston rods 41a of a pair of the driving cylinders 41 are coupled to the sliders 42 supporting both ends of the lower mold 21 has been indicated, it is possible to dispose a single driving cylinder 41 in the space 36 formed between the frame materials 12 by the spacer 33a and couple a front end of the piston rod 41a of this driving cylinder 41 to the lower mold 21.

The mold opening/closing device 4 for opening or closing the mold 2 located outside the frame 1 has the following structure. That is, the supporting frame 35 supported above the frame materials 12 is comprised of beams 45 extending vertically on sides of FIG. 3, which shows a plan view, and a beam 46 stretched from a front end of one beam 45 to one end of another beam 45. The beam 46 has guide rods 48 which are inserted therethrough and lift driving cylinders 47. A supporting member 49 is coupled to a front end of the piston rod 47a and a base end of the guide rod 48 of the lift driving cylinder 47. A hook 50 is provided outside each of the frame 1 located on both ends of the top face of the upper mold 20. On both ends of the supporting members 49 are provided engaging members 51, which engage with the hooks 50 of the upper mold 20 when the mold 2 is moved in the traverse direction so as to be taken out from the frame 1 in a condition where the lift driving cylinder 47 is extended to its extreme extent. Further, the hook 50 has engaging holes 50a and the engaging member 51 has fixing pins 52 which are fixed to the engaging holes 50a when the hook 50 engages with the engaging member 51 and fixing cylinders 53 for driving the fixing pins 52 from its fixing position to its retraction position. If the mold 2 is moved outside the frame 1 in the traverse direction so as to take it out and the hook 50 on the upper mold is engaged with the engaging member 51 so that the fixing pins 52 are fixed to the fixing holes 50a in the hook 50, the lift driving cylinder 47 is driven so as to retract as indicated by an arrow Y in FIG. 2. Accordingly, the upper mold 20 is lifted up so as to be separated from the lower mold 21, thereby opening the mold 2.

Figure 4:
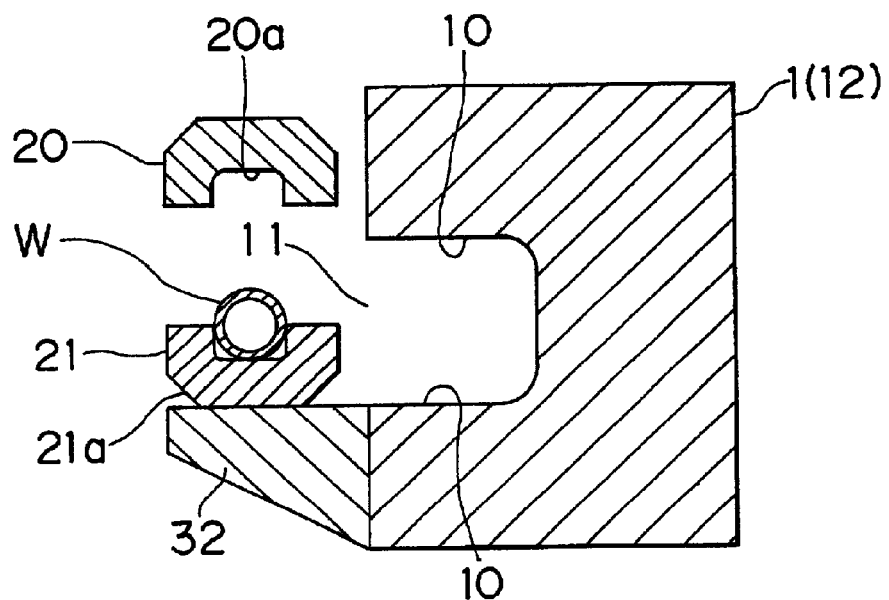
FIG. 4 is a sectional view for explaining a frame of the mold clamping apparatus of the invention and an initial state for carrying out hydraulic pressure bulging processing of a mold.
Figure 29:
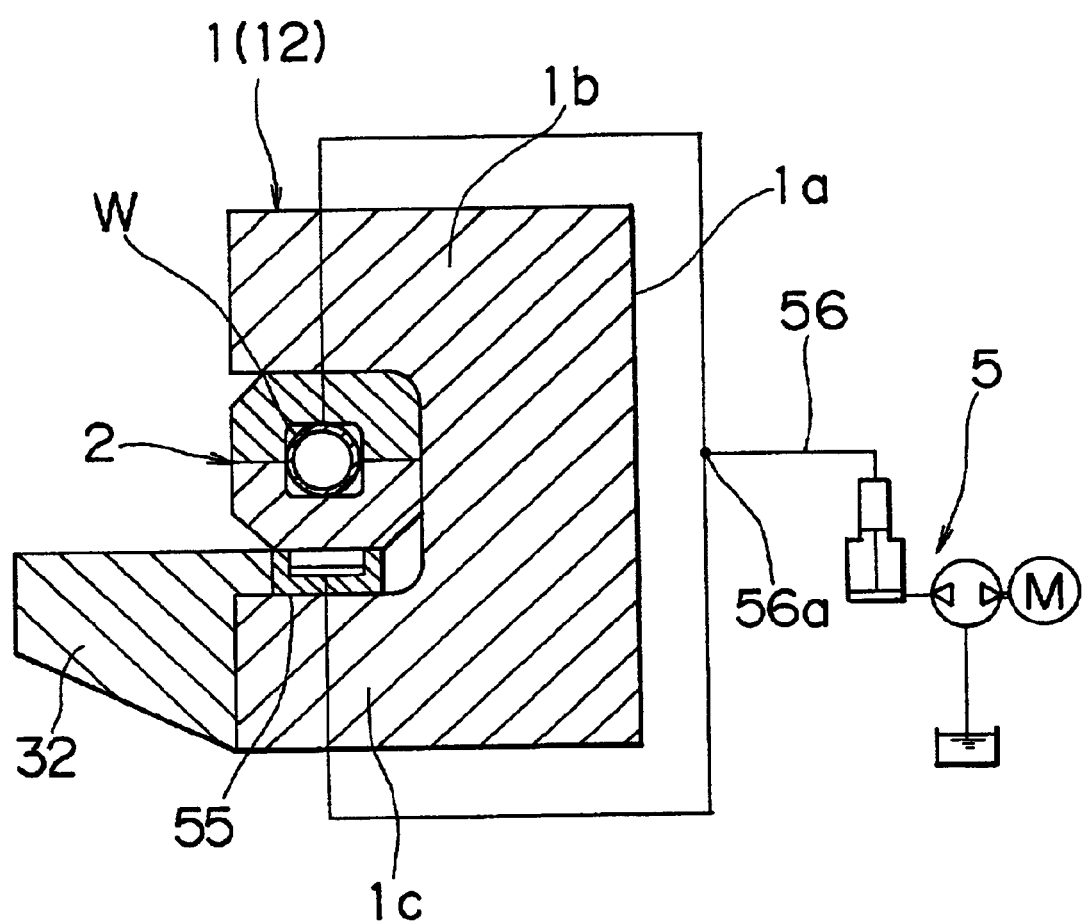
FIG. 29 is a schematic diagram showing the structure of the mold closing force application device of the invention.

In the mold clamping apparatus having the above described structure, in performing the hydraulic pressure bulging processing as shown in FIG. 4, first, the mold 2 is located on the supporting base 32 outside the frame 1 by the mold moving device 3 such that the upper mold 20 is separated from the lower mold 21 by the mold opening/closing device 4 and the mold 2 is opened. The material pipe W is accommodated in the accommodating portion 21a in the lower mold 21. Next, if the mold 2 is closed by approaching the upper mold 20 to the lower mold 21 with the mold opening/closing device 4 as shown in FIG. 5, the material pipe W is accommodated in the accommodating portions 20a, 21a so that it is captured in the diameter direction. Subsequently, by retracting the driving cylinder 41 of the mold moving device 3 as shown in FIG. 6, the mold 2 is moved in the traverse direction so that it is inserted from the open portion 11 of the frame 1 into the holding portion 10. Then, both ends of the material pipe W are sealed by ends of the axially pressing device 22 shown in FIG. 1. Then, if liquid is supplied from the high pressure liquid supply device shown in FIGS. 29 and 30 into inside of the material pipe W and pressurized, the material pipe W having a circular section is plastically deformed along the accommodating portions 20a, 21a in the mold 2 as shown in FIG. 7, so that a molded product W' having a rectangular section is formed. Although at this time, a mold opening force is generated inside the mold 2 by a pressure of liquid supplied into the material pipe W, the mold 2 is held closed without being opened because the mold 2 is held by the holding portion 10 in the frame 1. Although FIGS. 29 and 30 show that a pipe 56 is connected to the material pipe W through the frame 1 and the upper mold 20 in order to supply liquid to inside of the material pipe W from the high pressure liquid supply device 5, these diagrams are represented for explaining the invention conceptually and actually, the liquid is supplied from end portions of the material pipe W through the axially pressing device 22.

According to the invention, the mold is clamped by holding the mold 2 in the holding portion 10 in the frame 1. Further, because the frame 1 is provided with the open portion 11, as indicated with an arrow in FIG. 21, the mold 2 is moved in the traverse direction and held in the holding portion 10 in the frame 1.

Figure 35:
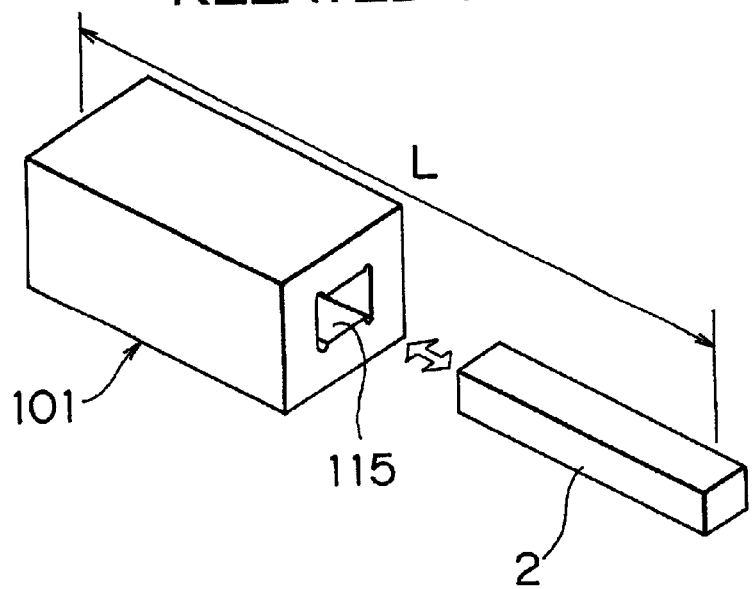
FIG. 35 is a perspective view showing a case where the mold is held in a conventional frame by comparing with the frame of the invention.

Therefore, as compared to the related art shown in FIG. 35, the installation width of the mold clamping apparatus can be shortened remarkably and the moving amount of the mold can be reduced, thereby reducing the cycle time. Further, the mold clamping apparatus of the invention has such a simple and compact structure that the frame 1 has the holding portion 10 and the open portion 11 different from a large press of the related art. Further, it is capable of holding the mold 2 securely against a mold opening force generated upon molding. Therefore, it is possible to incorporate this mold clamping apparatus in production equipment arranged before and after in production line as an apparatus for molding the molded product W' using the mold 2 and produce a necessary amount of the molded product W' in line.

Figure 22:
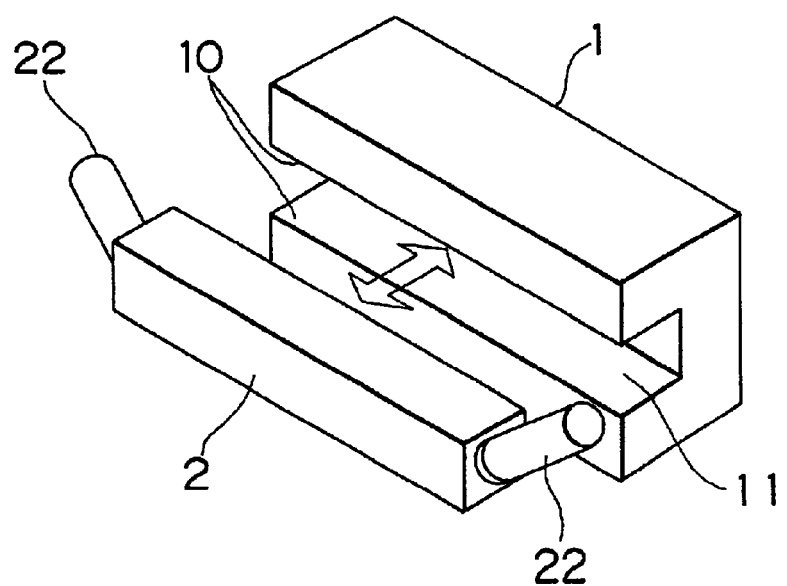
FIG. 22 is a perspective view showing a case where axially pressing device incliningly provided on a mold held by the mold clamping apparatus of the invention is provided.
Figure 23:
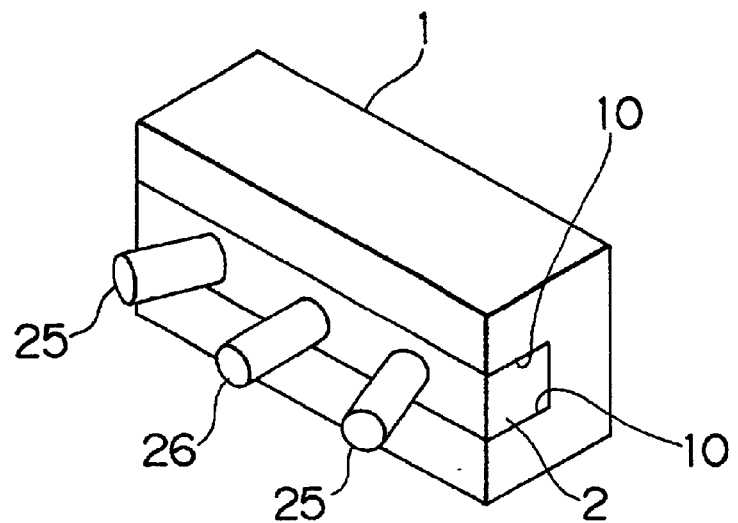
FIG. 23 is a perspective view showing a case where the mold to be held by the mold clamping apparatus of the invention is provided with back pressure counters and driving portion for a hole punch such that they are protruded from the mold.
Figure 36:
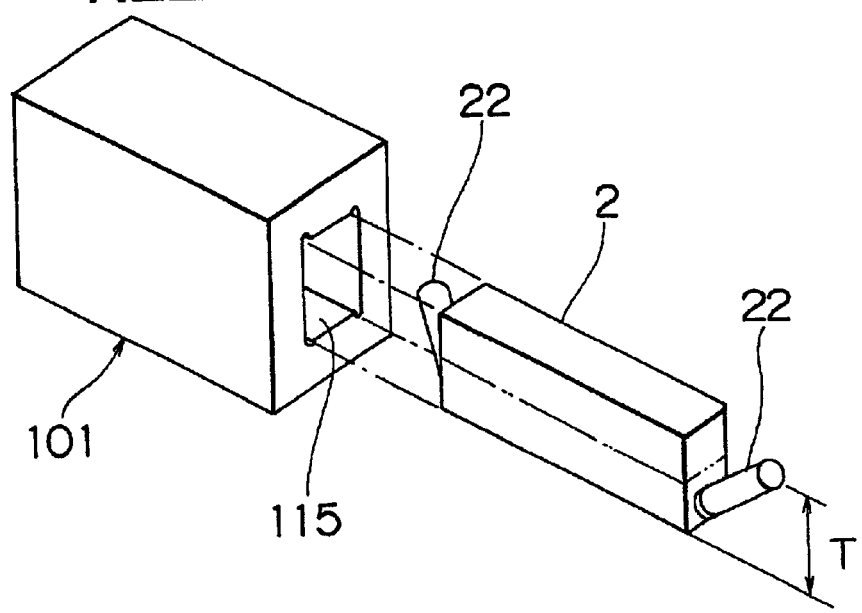
FIG. 36 is a perspective view showing a case where the mold is held in the conventional frame while axially pressing device is provided on the mold such that it is inclined for comparison with the frame of the invention.

Even in case where the axially pressing device 22 is provided obliquely on the mold 2 as shown in FIG. 22, because according to the invention, the mold 2 is moved in the traverse direction and inserted through the open portion 11 in the frame 1 so that it is held in the holding portion 10, the axially pressing device 22 never interferes with the frame 1. Thus, unlike the related art shown in FIG. 36, the height T of the mold does not have to be made larger than necessary and further, the frame 1 does not have to be formed correspondingly large.

Figure 38:
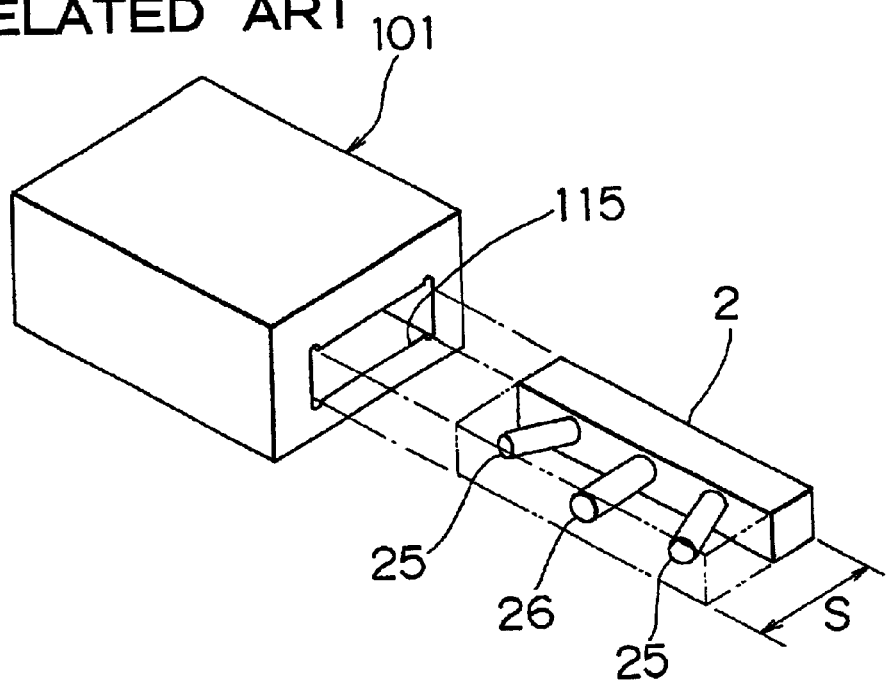
FIG. 38 is a perspective view showing a case where a mold provided with a back pressure counter or a hole punch is held in the conventional frame for comparison with the frame of the invention shown in FIG. 23.

Even in case where the mold 2 is provided with a back pressure counter cylinder 26 and driving cylinders 25 of the hole punch 24 such that they are protruded from the mold, the back pressure counter cylinder 26 and the driving cylinders 25 of the hole punch 24 can be disposed easily on the mold such that they are protruded through the open portion 11 in the frame 1. Therefore, unlike the related art shown in FIG. 38, it is not necessary to form a central cutout portion 115 having a width S which allows the back pressure counter cylinder 26 and the driving cylinders 25 of the hole punch 24 to pass through, so that the size of the entire frame 1 can be reduced.

Figure 24:
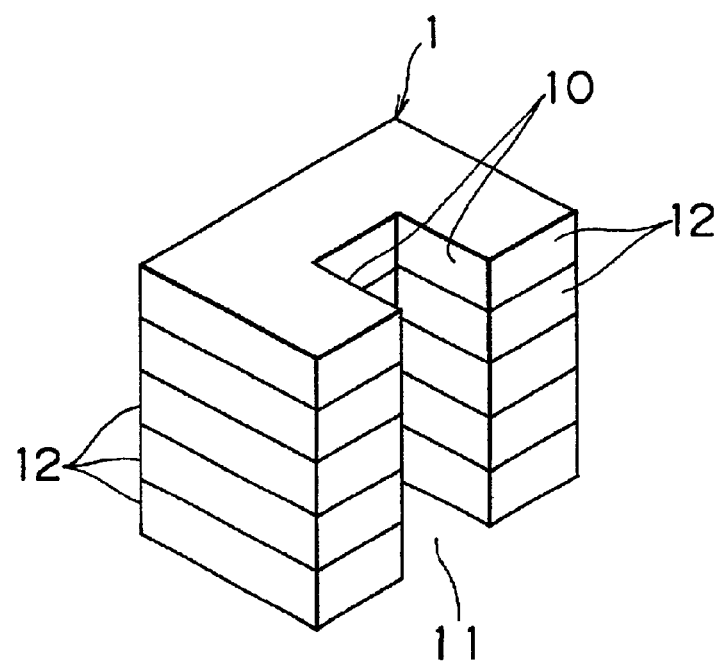
FIG. 24 is a perspective view showing still another embodiment of the frame of the invention.

The invention is not limited to the above-described embodiments. For example, instead of disposing the sheet-like frame materials 12 vertically, the frame 1 may be formed by disposing the frame materials 12 horizontally as shown in FIG. 24. In this case, upon hydraulic pressure bulging processing, supply of liquid to inside of the material pipe W accommodated in the mold 2 and discharge of air within the material pipe W can be carried out smoothly.

Figure 25:
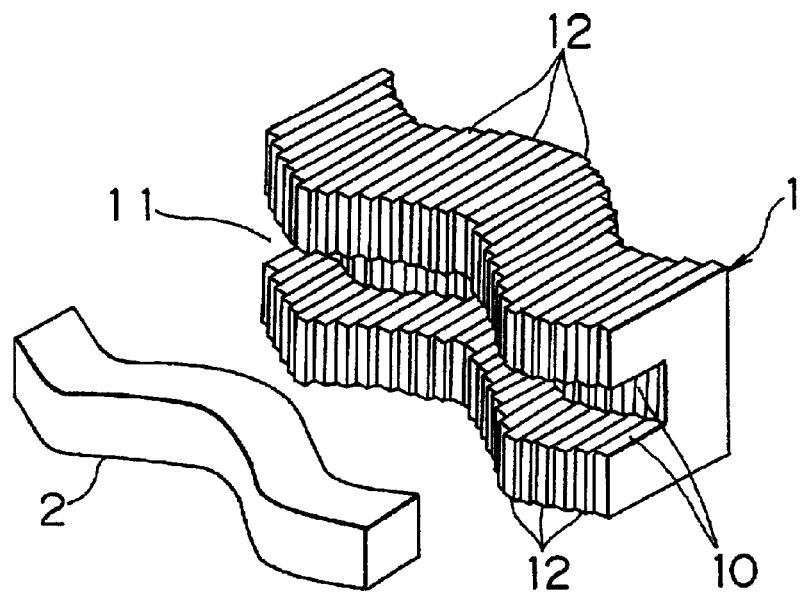
FIG. 25 is a perspective view showing a state in which the frame materials are disposed and laminated depending on the shape of the mold when the mold to be held by the mold clamping apparatus of the invention is formed so as to be curved or bent.
Figure 37:
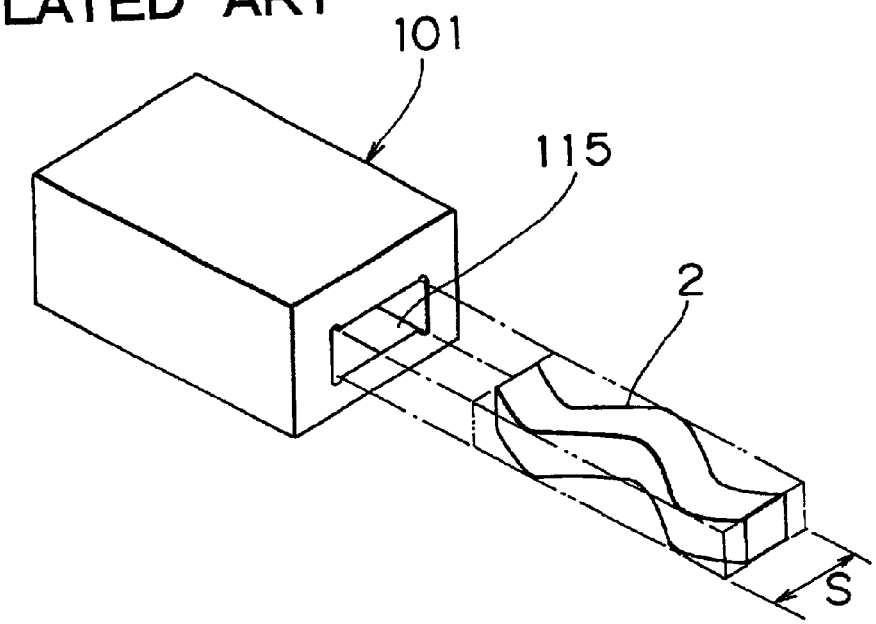
FIG. 37 is a perspective view showing a case where a mold formed in a curved or bent state is held in the conventional frame for comparison with the frame of the invention sown in FIG. 25.

In case of constructing the frame 1 by laminating a plurality of the sheet-like frame materials 12, as shown in FIG. 25, even if the mold 2 is curved or bent corresponding to the shape of the molded product W', it is not necessary to form the central cutout portion 115 having a width S which allows a maximum width of the mold 2 to pass through unlike the related art shown in FIG. 37, by laminating the sheet-like frame materials 12 such that they are shifted in a face direction corresponding to the shape of the mold 2. Consequently, the size of the entire frame 1 can be reduced.

Figure 26:
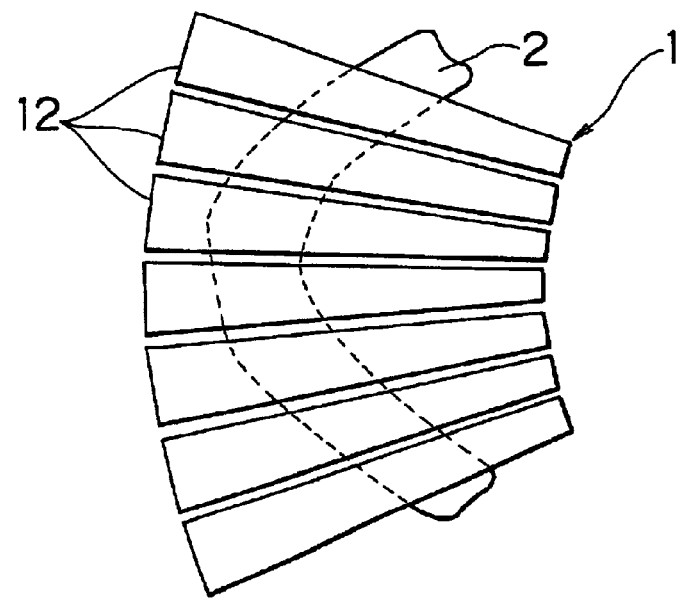
FIG. 26 is a plan view showing still another embodiment of the frame material composing the frames of the invention.

Further, the sheet-like frame material 12 for composing the frame 1 can be constructed by arranging and laminating frame materials 12 having a wedge-shaped section or fan-shaped frame materials 12, different in their thickness depending on the shape of the mold 2 to be held, as shown in FIG. 26.

Figure 27:
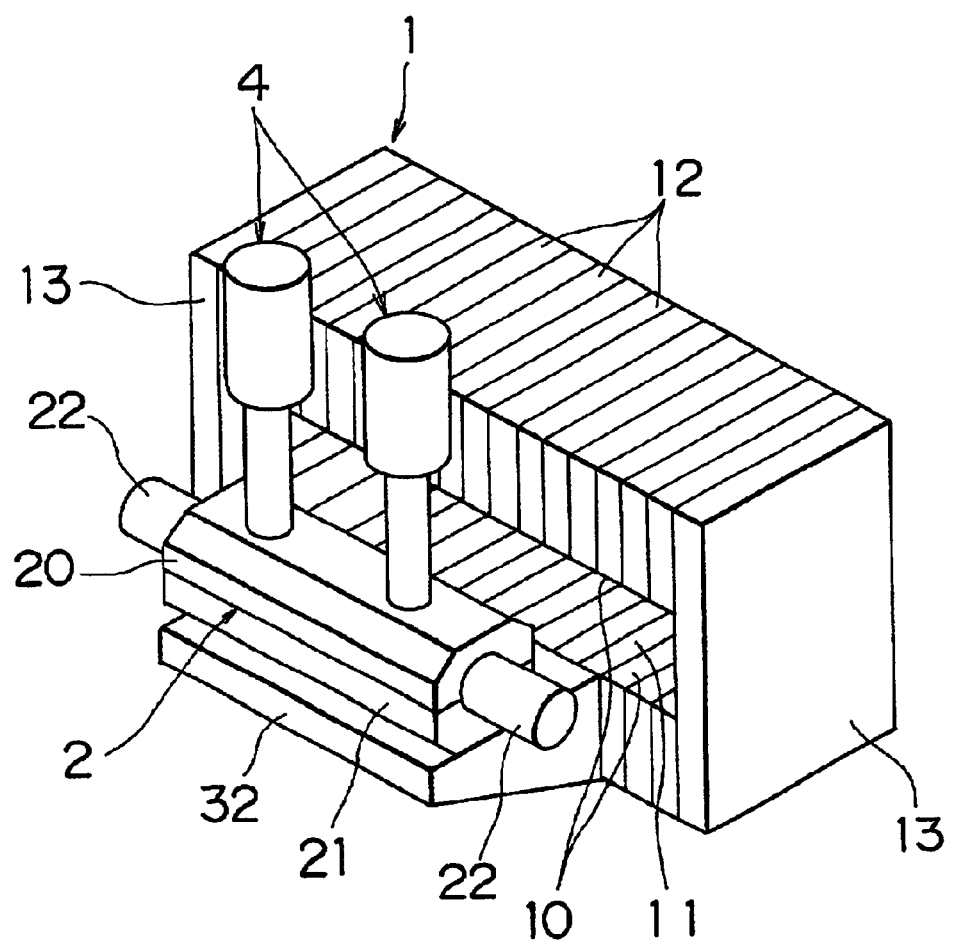
FIG. 27 is a perspective view showing still another embodiment having a structure for surrounding the peripheries of the mold using sheet-like frame materials at both ends of the frame.

Further, the frame 1 does not have to be constructed with only the frame materials 12 having the holding portion 10 and the open portion 11, but it is possible to use the sheet-like frame materials 13 having no holding portion 10 and open portion 11 for both ends of the frame 1 as shown in FIG. 27. In such a case, because the frame 1 surrounds the periphery of the mold, when liquid is discharged from inside of the molded product W' after the liquid budging processing is completed and the axially pressing device 22 is retreated from the molded product W', it can prevent liquid remaining in the molded product W' from being splashed out of the mold 2 to the surrounding.

Next, another embodiment of the mold clamping apparatus of the invention will be described in detail with reference to mainly FIGS. 28 to 32. Like reference numerals are attached to the same or corresponding portions in the above-described embodiments and a description thereof is omitted.

The mold clamping apparatus of this embodiment is provided with mold closing force application device 6 for applying a force for closing the mold 2 resisting the mold opening force generated in the mold 2 in addition to the above-described structure. This mold closing force application device 6 is constructed so as to apply a force higher than the mold opening force for the mold 2 using a force applied intending to open the mold 2, in a direction of closing the mold 2.

Figure 28:
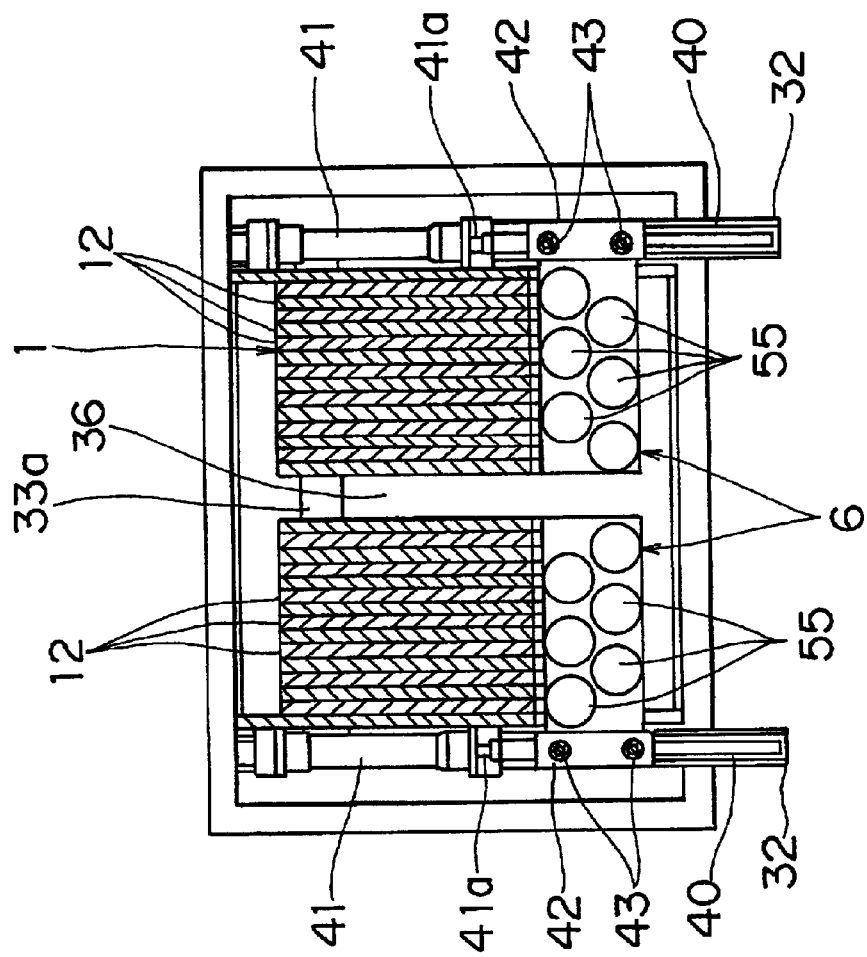
FIG. 28 is a view corresponding to a section taken along the line IIXVIII—IIXVIII of FIG. 1 for explaining an embodiment in which mold closing force application device of the invention is applied.
Figure 32:
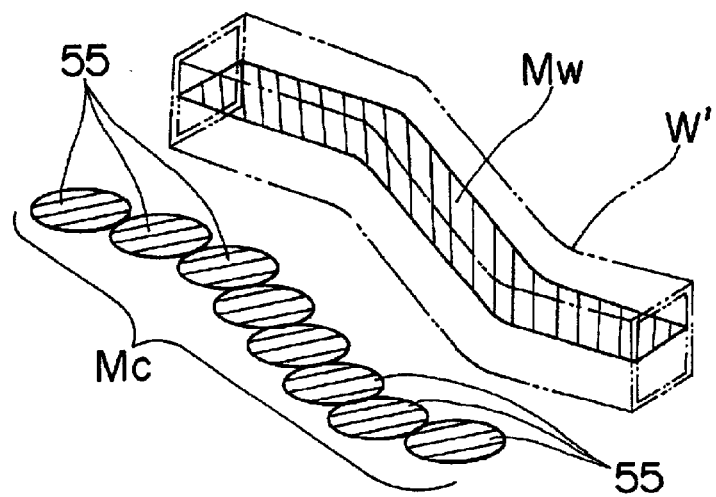
FIG. 32 is an explanatory view showing setting of a pressure receiving area in the cylinder of the mold closing force application device.

In the mold closing force application device 6, as shown in FIG. 28, a plurality of cylinders 55 are provided on one holding portion 10 (base portion 1c) of the frame 1. The respective cylinders 55 have a slight stroke and as shown in FIG. 32, may be arranged along the shape of the mold 2. A pipe 56 of the high-pressure liquid supply device 5 is connected to a bottom of the respective cylinders 55 and inside of the material pipe W in parallel through a branch portion 56a so as to drive the respective cylinders 55 by using a pressure of pressurized liquid supplied to inside of the material pipe W. To generate a force higher than the mold opening force generated in the mold 2 by using liquid of an equal pressure supplied from the high pressure liquid supply device 5 in the cylinders, as shown in FIG. 32, a total Mc of pressure receiving area of the cylinders 55 is so set as to be larger than a sectional area (projection area of a molded product) Mw obtained by projecting an internal pressure application portion of the molded product W' to a face perpendicular to an operating direction of the cylinders 55. The invention is not limited to this embodiment, but in case where the total Mc of the pressure receiving area of the cylinders 55 cannot be set to be larger than the molded product projection sectional area Mw, it is possible to generate a force higher than the mold opening force generated in the mold 2 in the cylinders 55 by providing a pressure increasing device (not shown) between the branch portion 56a of the pipe 56 and the cylinders 55. The mold closing force application device 6 is not limited to the embodiment in which the cylinders 55 are provided on the frame 1 having the open portion 11 and the holding portion 10, but it is possible to provide the cylinders 55' on a frame 101 formed in a closed sectional shape as shown in FIGS. 35 to 38 or 39.

If the mold 2 is moved in the traverse direction by the mold moving device 3 and inserted into the frame 1 as shown in FIGS. 29 and 30, it is held between the other holding portion 10 (overhang portion 1b) and the cylinders 55. Then, if liquid is supplied at a high pressure from the high pressure liquid supply device 5 to inside of the material pipe W in order to form the material pipe W having a circular section to a molded product W' having a rectangular section, the liquid is supplied to the cylinders 55 of the mold closing force application device 6 at the same pressure. Because as described above, the total Mc of the pressure receiving area of the cylinders is set larger than the molded product projection sectional area Mw, a force for pressing the mold 2 on the cylinder 55 toward the holding portion 10 of the overhang portion 1b of the frame 1 follows the pressure of liquid supplied into the material pipe W so that it always exceeds the mold opening force of the mold 2 and cancels it. In this way, the mold closing force application device 6 is constructed so as to employ the pressure of liquid supplied to inside of the material pipe W. Because such a structure ensures complete elimination of opening of the mold 2, the mold clamping apparatus of the invention can be applied to not only the hydraulic pressure bulging processing apparatus but also for mold clamping a mold in which resin material is to be charged by injection or foaming in an injection molding machine. Although in FIG. 30, the lower mold 21 and the cylinder 55 are represented such that a relatively large gap is formed between the lower mold 21 and the cylinder 55, in this diagram, that gap is expressed larger than the actual size for explaining an operation of the cylinders 55 and actually, the gap is a very small.

The mold closing force application device 6 of the invention is not limited to the above-described embodiment, but any structure is permitted as long as it is capable of applying a force higher than the mold opening force for the mold 2 in a direction of closing the mold 2 resisting the mold opening force generated in the mold 2. For example, it is possible to so construct that liquid of a predetermined pressure supplied to the cylinder 55 is supplied into the material pipe W by connecting the pipe 56 of the high pressure liquid supply device 5 to the cylinder 55 and further connecting the cylinder 55 and inside of the material pipe W in series through the pipe 57. Although not shown, it is also possible to provide the cylinders 55 on the holding portion 10 of the overhang portion 1b or the mold 2 and then, connect the pipe 56 to the cylinder 55 and inside of the material pipe W in parallel or in series.

Next, still another embodiment of the invention will be described in detail with reference to FIG. 33. Meanwhile, like reference numerals are attached to the same or corresponding portions in the above-described embodiments and a description thereof is omitted.

In addition to the above-described structure, the mold clamping apparatus of this embodiment is so constructed that the frame 1 is capable of holding the molds 2, 2 different in length by combining a frame material 12 provided with a single holding portion 10 and the open portion 11 with a frame material 12' provided with a plurality of the holding portions 10, 10 and the open portions 11, 11. Further, the mold moving device 3 is constructed so as to be capable of moving both the molds 2, 2 out of/into the holding portion in the frame 1.

In a case indicated by FIG. 33, the driving cylinder 41 of the mold moving device 3 is composed of a pair of rod type double acting cylinders. A space 36 is formed between the frame material having a single holding portion and open portion and the frame material having a plurality of the holding portions and open portions as shown in FIG. 28. The other driving cylinder 41 is disposed in such a space (representation thereof is omitted in FIG. 33). Due to such a structure, it is not necessary to provide the driving cylinders 41 corresponding to the respective holding portions 10, 10 of the frame 1, so that the molds 2, 2 different in length can be inserted or taken out alternately by device of a pair of the driving cylinders. As described above, the driving cylinders 41 do not always have to be provided in pair and it is possible to separate the adjacent frame materials 12 or 12' at an arbitrary position so as to form a space and provide a single double rod type driving cylinder 41 in this space.

Further, the invention is not limited to the above-described embodiments and, although not shown, it is possible to form a space by placing the frame material 12 adjacent functional device necessary for molding, such as a counter cylinder unit, an ejector unit 23 and piercing unit 45, separately so as to form a space and then accommodate the functional device in this space. In this case, it is so constructed that when the mold 2 is inserted into the holding portion 10 of the frame 1, the respective functional device are connected to the mold 2.

Next, a mold clamping method of the invention will be described in detail taking a case where hydraulic pressure bulging processing is carried out using the molds and the mold clamping apparatus having the above-described structure.

According to the mold clamping method of the invention, the mold 2, in which a mold opening force is generated when a pressure for opening the mold is applied to the inside of the mold, is closed and held. The frame 1 is prepared which includes the holding portion 10 for holding the mold 2 resisting the generated mold opening force and the open portion 11, which allows the mold 2 to be inserted or taken out into/from the holding portion 10 in the traverse direction thereof. By moving the mold 2 in the traverse direction, the mold 2 is inserted through the open portion 11 in the frame 1 into the holding portion 10 and held in the closing condition. Then, the mold 2 is taken out from the holding portion 10 through the open portion 11 and opened outside the frame 1.

The frame 1 for holding the mold 2 is so constructed by laminating a plurality of the sheet-like frame materials 12 having the holding portion 10 and the open portion 11 as shown in FIG. 1. When carrying out hydraulic pressure bulging processing, the mold 2 is located outside the frame 1, such that the upper mold 20 is separated from the lower mold 21 by the mold opening/closing device 4 so that the mold is open. In this condition, the material pipe W is placed on the lower mold 21. Then by approaching the upper mold 20 to the lower mold 21, the mold 2 is closed so that the material pipe W is accommodated in the mold 2. Next, the mold accommodating the material pipe W is moved in the traverse direction and inserted into the holding portion 10 through the open portion 11 in the frame 1 and then held therein. After that, ends of the axially pressing devices 22 are brought into contact with ends of the material pipe W accommodated in the mold 2 so as to seal them. Then, by supplying liquid from the high pressure liquid supply device 5 shown in FIGS. 29 and 30 through the ends of the material pipe W into the inside, the material pipe W is plastically deformed to produce a molded product W of a predetermined shape. Although at this time, a mold opening force is generated in the mold 2 by the pressure of liquid supplied into the material pipe W, the mold is kept closed without being opened, because the mold 2 is held by the holding portion 10 in the frame 1.

If the molded product W' of the predetermined shape is formed, pressurization of liquid is stopped and the liquid is discharged from the inside of the molded product W' and after that, the axially pressing device 22 is retracted. Then, the mold 2 is moved in the traverse direction and taken out of the frame 1 through the open portion 11. After opening the mold 2, the molded product W is carried and then, a material pipe W to be used in the next cycle is accommodated in the mold 2. Because the mold 2 is moved in the traverse direction, the amount of displacement is small, thereby making it possible to reduce cycle time. Further, because the material pipe W is set in the mold 2 outside the frame 1 or the molded product W' is taken out of the mold, improvement of working efficiency is achieved.

Although the structure in which the frame materials having different strength levels are laminated has been described taking a case where this embodiment is applied to the apparatus frame of a hydraulic pressure molding apparatus, that laminated structure may be applied to the apparatus frame of a press apparatus. The apparatus frame of the laminated structure of the invention is particularly suitable for an apparatus in which a single axis stress is generated, and this laminated structure may be applied to the press apparatus also because the single axis stress is generated therein as in the case with the hydraulic pressure molding apparatus.

Although the structure of the frame material in which the strength of the surface thereof is adjusted higher than that of the central portion and the stress concentration portion thereof is chamfered has been described in this embodiment taking a case where this is applied to the apparatus frame of the hydraulic pressure molding apparatus, that frame material structure may be applied to the apparatus frame of the press apparatus.

According to a first aspect of the invention, with a simple structure comprising a frame including a holding portion for holding the mold resisting the generated mold opening force and an open portion allowing the mold to be inserted/taken out into/from the holding portion in the traverse direction thereof, mold moving device for moving the mold to insert/take out the mold into/from the holding portion through the open portion in the frame, and a mold opening/closing device for opening/closing the mold located outside the frame, the mold can be held securely in a condition in which the mold is closed, resisting a pressure intending to open the mold. Further, consumption energy, equipment maintenance cost and production cost can be reduced, and compactness of the apparatus can be achieved. Further, loading of material on the mold, carrying-out of a molded product from the mold, insertion and take-out of the mold into/from the frame can be carried out securely and easily in a short time. Consequently, it is possible to provide a mold clamping apparatus capable of improving working efficiency and molding effectiveness.

By setting molding parameters of the respective parts in the frame so that a stress index value K calculated according to the equation is in a range of 0.2 and 15, the holding portion in the frame is capable of securely and stably holding a mold in which a mold opening force is generated when a pressure is applied, and compactness of the apparatus can be achieved.

Because plural holding portions and open portions are provided, plural molds can be held at the same time as necessary, space effectiveness of an installation place and molding effectiveness of the mold can be improved.

Because the mold moving device is capable of moving plural molds to insert/take out the molds into/from the holding portions through the respective open portions, reduction of installation space and energy can be achieved.

Further, by providing mold closing force application device for applying a force for closing the mold resisting the mold opening force, the mold can be held securely in a condition in which it is closed resisting the pressure intending to open the mold. Consequently, a high precision molded product can be formed reliably.

Because the mold closing force application device applies a force higher than the mold opening force in a direction of closing the mold using a pressure applied to the inside of the mold, production cost can be reduced and the mold clamping control can be carried out easily with a simple structure.

Because the mold is provided with axially pressing device for hydraulic pressure bulging processing, the mold is inserted into or taken out from the mold integrally with the axially pressing device for hydraulic pressure bulging processing. Consequently, the molding cycle is shortened and even if it is necessary to provide the axially pressing device inclinedly with respect to the longitudinal direction of the mold, displacement for insertion and take-out of the mold is restricted.

Because predetermined functional device necessary for molding is provided such that it is protruded from a face not opposing the frame, the functional device does not interfere with the frame when inserting or taking out the mold into/from the frame. Thus, the frame does not have to be formed so larger than necessary, thereby achieving further compactness of the frame.

Due to provision of the mold closing force application device for applying a force higher than the mold opening force in a direction of closing the mold using a pressure applied to the inside of the mold, the structure is simplified and the control is facilitated. Further, because upon molding, the mold is held in the holding portion in the frame and a force higher than the mold opening force is applied to the mold in the direction of closing the mold by the mold closing force application device, the mold can be reliably prevented from being opened.

Because the frame is constructed by laminating plural sheet-like frame materials in the longitudinal direction of the mold, the open portions and holding portions can be formed easily in a predetermined shape. Further, by adjusting the number of the frame materials depending on the mold, a desired frame can be produced easily at a low cost.

By constructing the frame material by combining the frame material containing a single holding portion and open portion with the frame material containing plural holding portions and open portions, the frame capable of holding plural molds each having a different length can be constructed easily.

By arranging the frame materials depending on the shape of a mold to be held, an optimum frame for the mold to be held can be produced easily at a low cost.

By laminating frame materials each having a different thickness depending on the shape of a mold to be held, an optimum frame for the mold to be held can be manufactured easily at a low cost.

By laminating the frame materials adjacent each other at a predetermined position such that they are apart from each other depending on predetermined functional device necessary for molding provided protrudedly from the mold to be held, a space capable of accommodating the functional device is provided. Therefore, in case where a mold provided with the protrudedly provided functional device necessary for the molding is held in the holding portion in the frame, a space capable of accommodating the functional device can be formed at any place easily, so that the functional device can be provided as necessary.

The predetermined functional device necessary for molding is constructed so as to be detachably connected to the mold and the frame has a space formed by laminating the frame materials adjacent each other at a predetermined position, such that the functional device is provided in the space. Thus, a space in which the predetermined functional device necessary for molding is provided can be formed easily at any place and further, when the mold is inserted into the mold and held therein, it can be connected to the functional device. Moreover, when the mold is taken out from the frame, it can be disconnected from the functional device. Thus, the functional device can be provided in any space. As a result, no restriction for molding is imposed on the functional device. Also, because the mold does not have to be provided with any functional device, the structure thereof is simplified and when inserting/taking out the mold into/from the frame, it is not necessary to consider interference with the functional device.

Because the frame is constructed by laminating the frame materials adjacent each other at a predetermined position such that they are apart from each other, a space is formed. Because the mold moving device is disposed within the space, compactness of the frame can be achieved.

According to another aspect of the invention, the invention provides a mold clamping method for clamping a mold, comprising: preparing a frame containing a holding portion for holding the mold resisting the generated mold opening force and an open portion which allows the mold to be inserted into or taken out from the holding portion; and inserting the mold into the holding portion through the open portion in the frame by moving the mold in a traverse direction thereof and closing and holding the mold, and after molding, taking out the mold from the holding portion through the open portion and opening/closing the mold outside the frame. Thus, with a simple structure, the mold can be held securely resisting a pressure intending to open the mold and molding effectiveness in carrying the material into and taking it out of the mold can be improved. Further, with such a compact structure, energy consumption, equipment maintenance cost and production cost can be reduced.

According to the above-described embodiment, in the frame material composing the frame, the strength of the surface is higher than the strength in the center in the thickness direction and the stress concentration portion is chamfered. Although decarburized layer exists on the surface of the frame material, this decarburized layer is removed from the surface of the frame material in the stress concentration portion by chamfering of the stress concentration portion.

Consequently, the strength of the entire frame is enhanced and reduction of the size and cost can be achieved. Further, reduction of the processing cost and improvement of yield rate of steel plate can be achieved.

Further, the frame is constructed by laminating frame plates each having a different strength level and thickness.

Because a material having a high strength level is employed for a maximum stress portion of the frame while an inexpensive material having a low strength level is employed for a portion having a low stress, there is no waste in selection of the material thereby leading to reduction of production cost.

What is claimed is:

1. A mold clamping apparatus comprising:
    a mold having a longer side and a shorter side and in which a mold opening force is generated by applying a pressure for opening the mold to an inside of said mold;
    a frame including a holding portion for holding said mold resisting a generated mold opening force and an open portion allowing said mold to be inserted into/taken out from said holding portion in a direction of the shorter side of said mold;
    a mold moving device that moves said mold to insert/take out said mold into/from said holding portion through the open portion in said frame; and
    a mold opening/closing device that opens/closes the mold located outside the frame, wherein
    said frame comprises an overhang portion and a base portion, composing the holding portion, and a post portion for joining the overhang portion to the base portion, and
    molding parameters of respective portions of the frame are set up so that a stress index value K calculated according to the following expression is in a range of 0.2 to 15:

$$K=[(6\Phi E/D^2)+(\Phi/D)](1+(0.0188D/C+0.243)(D/R)^{1.18})$$

wherein
    C is a maximum width of the overhang portion;
    D is a maximum width of the post portion;
    E is a minimum distance from the post portion to the center in the mold to which a pressure is applied;
    R is a maximum curvature radius of a connecting corner portion between the overhang portion or base portion and the post portion; and
    Φ is a width of a projection plane perpendicular to a direction of a mold opening force as a portion to which a pressure in the mold is applied.

2. A mold clamping apparatus according to claim 1, further comprising:
    a mold closing force application device that applies a force for closing the mold.

3. A mold clamping apparatus according to claim 2, wherein the mold closing force application device applies a force higher than a mold opening force using a pressure applied to the inside of the mold.

4. A mold clamping apparatus according to claim 1, further comprising:
    an axially pressing device provided on the mold for performing hydraulic pressure bulging processing.

5. A mold clamping apparatus according to claim 1, wherein
    a predetermined functional device necessary for molding is provided such that protrudes from a face not opposing the frame of the mold.

6. A mold clamping apparatus, comprising:
    a mold having a longer side and a shorter side and in which a mold opening force is generated by applying a pressure for opening the mold to an inside of said mold;
    a frame including a holding portion for holding said mold resisting a generated mold opening force and an open portion allowing said mold to be inserted into/taken out from said holding portion in a direction of the shorter side of said mold;

a mold moving device that moves said mold to insert/take out said mold into/from said holding portion through the open portion in said frame; and a mold opening/closing device that opens/closes the mold located outside the frame, wherein said frame comprises a plurality of the holding portions and open portions.

7. A mold clamping apparatus according to claim 6, wherein the mold moving device moves a plurality of molds to insert or take out said molds into/from the holding portion through each open portion.

8. A mold clamping apparatus comprising:

a mold having a longer side and a shorter side and in which a mold opening force is generated by applying a pressure for opening the mold to an inside of said mold;

a frame including a holding portion for holding said mold resisting a generated mold opening force and an open portion allowing said mold to be inserted into/taken out from said holding portion in a direction of the shorter side of said mold;

a mold moving device that moves said mold to insert/take out said mold into/from said holding portion through the open portion in said frame; and a mold opening/closing device that opens/closes the mold located outside the frame, wherein said frame is constructed by laminating a plurality of sheet-like frame materials in the longitudinal direction of the frame.

9. A mold clamping apparatus according to claim 8, wherein a strength of the surface of said frame material is higher than a strength a central portion in the a longitudinal direction of the frame material.

10. A mold clamping apparatus to claim 8, wherein a stress concentration portion of said frame material is chamfered.

11. A mold clamping apparatus according to claim 10, wherein said frame material has a decarburized layer on a surface thereof, and the decarburized layer is removed from a portion of said frame material subjected to chamfering processing.

12. A mold clamping apparatus according to claim 10, wherein residual compression stress is generated in a tensile stress concentration portion of the frame material.

13. A mold clamping apparatus according to claim 8, wherein each of the plural laminated frame materials has a different strength.

14. A mold clamping apparatus according to claim 8, wherein each of the plural laminated frame materials has a different strength and a different thickness.

15. A mold clamping apparatus according to claim 8, wherein said frame is constructed by laminating thick frame materials each having a low strength and thin frame materials each having a high strength in combination.

16. A mold clamping apparatus according to claim 8, wherein said frame is constructed by combining frame materials having a single holding portion and open portion with frame materials having plural holding portions and open portions.

17. A mold clamping apparatus according to claim 8, wherein said frame is constructed by arranging the frame materials corresponding to a shape of a mold to be held.

18. A mold clamping apparatus according to claim 8, wherein said frame is constructed by laminating the frame materials each having a different thickness depending on a shape of a mold to be held.

19. A mold clamping apparatus according to claim 8, wherein said mold has a predetermined functional device necessary for molding that protrudes from the mold, and said predetermined functional device is disposed over a space of said frame formed between laminated portions of said frame.

20. A mold clamping apparatus according to claim 8, wherein said mold has a predetermined functional device which is necessary for molding that protrudes from the mold, and is detachably connected to the mold, and said functional device is disposed over a space of said frame formed between laminated portions of said frame.

21. A mold clamping apparatus according to claim 8, wherein said mold moving device is disposed within a space of said frame formed between laminated portions of said frame.

22. A mold clamping apparatus further comprising:

a mold in which a mold opening force is generated by applying a pressure for opening the mold;

a frame having a holding portion for holding the mold resisting a generated mold opening force; and a mold closing force application device, provided in the holding portion of the frame, that applies a force higher than the mold opening force in a direction of closing the mold using a pressure applied to an inside of the mold, wherein said frame includes a plurality of laminated, sheet-like frame materials in a longitudinal direction of the frame.

23. A mold clamping apparatus according to claim 22, wherein said frame is constructed by combining frame materials having a single holding portion and an open portion with frame materials having plural holding portions and open portions.

24. A mold clamping apparatus according to claim 22, wherein said frame is constructed by arranging the frame materials corresponding to a shape of a mold to be held.

25. A mold clamping apparatus according to claim 22, wherein said frame includes frame materials each having a different thickness depending on a shape of a mold to be held.

26. A mold clamping apparatus according to claim 22, wherein said mold has a predetermined functional device necessary for molding that protrudes from the mold, and said predetermined functional device is disposed over a space of said frame between laminated portions of said frame.

27. A mold clamping apparatus according to claim 22, wherein
said mold has a predetermined functional device which is necessary for molding that protrudes from the mold, and is detachably connected to the mold, and
said functional device is disposed over a space of said frame formed between laminated portions of said frame.

28. A mold clamping apparatus according to claim 22, wherein
said mold moving device is disposed within a space of said frame formed between laminated portions of said frame.

29. A mold clamping method for clamping a mold having a longer side and a shorter side and in which a mold opening force is generated by applying a pressure for opening the mold to an inside of the mold, comprising the steps of:
preparing a frame containing a holding portion for holding the mold and an open portion which allows the mold to be inserted into/taken out from the holding portion, wherein said frame is constructed by laminating a plurality of sheet-like frame materials in a longitudinal direction of the frame; and
inserting the mold into the holding portion through the open portion in the frame by moving the mold in a direction of a longer side of said mold and closing and holding the mold, and after molding, taking out the mold from the holding portion through the open portion and opening the mold outside the frame.

* * * * *

UNITED STATES PATENT AND TRADEMARK OFFICE
CERTIFICATE OF CORRECTION

PATENT NO. : 6,892,560 B2
DATED : May 17, 2005
INVENTOR(S) : Koichi Hiramatsu et al.

It is certified that error appears in the above-identified patent and that said Letters Patent is hereby corrected as shown below:

Title page,
Item [75], Inventors, change "Kyoichi Mano, Ciryu (JP)" to -- Kyoichi Mano, Chiryu (JP) --.

Column 10,
Line 10, change "$K=\delta P=\{\ldots$" to -- $K=\delta/P=\{\ldots$ --.

Column 23,
Line 35, change "in the a longitudinal" to -- in a longitudinal --.

Signed and Sealed this

Eighth Day of November, 2005

JON W. DUDAS
*Director of the United States Patent and Trademark Office*